United States Patent
Aybay et al.

(10) Patent No.: US 8,442,048 B2
(45) Date of Patent: May 14, 2013

(54) METHODS AND APPARATUS FOR CONFIGURING A VIRTUAL NETWORK SWITCH

(75) Inventors: Gunes Aybay, Los Altos, CA (US); Pradeep Sindhu, Los Altos Hills, CA (US); Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 763 days.

(21) Appl. No.: 12/612,210

(22) Filed: Nov. 4, 2009

(65) Prior Publication Data

US 2011/0103259 A1     May 5, 2011

(51) Int. Cl.
*H04L 12/28*     (2006.01)
*H04L 12/56*     (2006.01)
*H04L 12/26*     (2006.01)

(52) U.S. Cl.
USPC ............................. 370/392; 370/396; 370/230

(58) Field of Classification Search ........................ None
See application file for complete search history.

(56) References Cited

U.S. PATENT DOCUMENTS

| | | | |
|---|---|---|---|
| 5,130,984 A | 7/1992 | Cisneros | |
| 5,138,615 A | 8/1992 | Lamport et al. | |
| 5,801,641 A | 9/1998 | Yang et al. | |
| 6,011,779 A | 1/2000 | Wills | |
| 6,073,089 A | 6/2000 | Baker et al. | |
| 6,189,044 B1 * | 2/2001 | Thomson et al. | 709/242 |
| 6,522,627 B1 | 2/2003 | Mauger | |
| 6,594,261 B1 * | 7/2003 | Boura et al. | 370/389 |
| 6,633,548 B2 | 10/2003 | Bachmutsky et al. | |
| 6,657,962 B1 | 12/2003 | Barri et al. | |
| 6,775,230 B1 | 8/2004 | Watanabe et al. | |
| 6,807,172 B1 | 10/2004 | Levenson et al. | |
| 6,970,902 B1 | 11/2005 | Moon | |
| 6,973,032 B1 | 12/2005 | Casley et al. | |
| 6,985,486 B1 | 1/2006 | Agrawal | |
| 7,027,412 B2 | 4/2006 | Miyamoto et al. | |
| 7,069,413 B1 | 6/2006 | Agesen et al. | |
| 7,075,934 B2 | 7/2006 | Chiussi et al. | |
| 7,221,676 B2 | 5/2007 | Green et al. | |

(Continued)

FOREIGN PATENT DOCUMENTS

| | | |
|---|---|---|
| EP | 0 809 380 A2 | 11/1997 |
| GB | 2 361 139 A | 10/2001 |

OTHER PUBLICATIONS

U.S. Appl. No. 12/346,608, filed Dec. 30, 2008, entitled "Methods and Apparatus Related to Data Transmissions Between Virtual Resources Via a Network Device" (80 pgs).

(Continued)

*Primary Examiner* — Faruk Hamza
*Assistant Examiner* — Cassandra Decker
(74) *Attorney, Agent, or Firm* — Cooley LLP

(57) ABSTRACT

In one embodiment, a method includes sending a configuration signal to a virtual network switch module within a control plane of a communications network. The configuration signal is configured to define a first network rule at the virtual network switch module. The method also includes configuring a packet forwarding module such that the packet forwarding module implements a second network rule, and receiving status information from the virtual network switch module and status information from the packet forwarding module. The status information is received via the control plane.

19 Claims, 8 Drawing Sheets

U.S. PATENT DOCUMENTS

| | | |
|---|---|---|
| 7,313,135 B2 | 12/2007 | Wyatt |
| 7,327,680 B1 | 2/2008 | Kloth |
| 7,369,561 B2 | 5/2008 | Wybenga et al. |
| 7,406,038 B1 | 7/2008 | Oelke et al. |
| 7,409,487 B1 | 8/2008 | Chen et al. |
| 7,415,034 B2 | 8/2008 | Muller et al. |
| 7,428,219 B2 | 9/2008 | Khosravi |
| 7,430,164 B2 | 9/2008 | Bare |
| 7,441,268 B2 | 10/2008 | Remedios |
| 7,580,415 B2 | 8/2009 | Hudson et al. |
| 7,630,368 B2 | 12/2009 | Tripathi et al. |
| 7,689,747 B2 | 3/2010 | Vega et al. |
| 7,738,457 B2 | 6/2010 | Nordmark et al. |
| 7,757,059 B1 | 7/2010 | Ofer et al. |
| 7,788,411 B2 | 8/2010 | Belgaied et al. |
| 7,836,212 B2 | 11/2010 | Tripathi et al. |
| 8,045,546 B1 | 10/2011 | Bao et al. |
| 8,050,256 B1 | 11/2011 | Bao et al. |
| 2002/0118644 A1 | 8/2002 | Moir |
| 2002/0194294 A1 | 12/2002 | Blumenau et al. |
| 2003/0026287 A1 | 2/2003 | Mullendore et al. |
| 2003/0063562 A1* | 4/2003 | Sarkinen et al. ............. 370/230 |
| 2003/0065878 A1 | 4/2003 | Krishna et al. |
| 2003/0142668 A1 | 7/2003 | Wyatt |
| 2004/0151188 A1 | 8/2004 | Maveli et al. |
| 2004/0177157 A1 | 9/2004 | Mistry et al. |
| 2004/0205253 A1 | 10/2004 | Arndt et al. |
| 2005/0138308 A1 | 6/2005 | Morishita et al. |
| 2005/0177552 A1 | 8/2005 | Bass et al. |
| 2005/0192969 A1 | 9/2005 | Haga et al. |
| 2005/0198303 A1 | 9/2005 | Knauerhase et al. |
| 2005/0198362 A1* | 9/2005 | Navada et al. ................ 709/236 |
| 2005/0207394 A1* | 9/2005 | Takeyoshi et al. ........... 370/351 |
| 2006/0259952 A1 | 11/2006 | Lok |
| 2007/0005685 A1 | 1/2007 | Chau et al. |
| 2007/0008949 A1 | 1/2007 | Balandin |
| 2007/0014288 A1 | 1/2007 | Lim et al. |
| 2007/0078988 A1 | 4/2007 | Miloushev et al. |
| 2007/0079307 A1 | 4/2007 | Dhawan et al. |
| 2007/0098408 A1 | 5/2007 | Handelman |
| 2007/0140235 A1 | 6/2007 | Aysan et al. |
| 2007/0204265 A1 | 8/2007 | Oshins |
| 2007/0211716 A1 | 9/2007 | Oz et al. |
| 2007/0219911 A1 | 9/2007 | Abe |
| 2007/0244997 A1 | 10/2007 | Tindal |
| 2007/0280243 A1 | 12/2007 | Wray et al. |
| 2007/0280253 A1 | 12/2007 | Rooholamini et al. |
| 2007/0283186 A1 | 12/2007 | Madnani et al. |
| 2007/0297428 A1 | 12/2007 | Bose et al. |
| 2008/0002663 A1 | 1/2008 | Tripathi et al. |
| 2008/0005344 A1 | 1/2008 | Ford et al. |
| 2008/0019365 A1 | 1/2008 | Tripathi et al. |
| 2008/0043756 A1 | 2/2008 | Droux et al. |
| 2008/0043765 A1 | 2/2008 | Belgaied et al. |
| 2008/0046610 A1 | 2/2008 | Tripathi et al. |
| 2008/0046735 A1 | 2/2008 | Nedeltchev et al. |
| 2008/0080548 A1 | 4/2008 | Mullendore et al. |
| 2008/0082977 A1 | 4/2008 | Araujo et al. |
| 2008/0095361 A1 | 4/2008 | Wifvesson et al. |
| 2008/0098392 A1 | 4/2008 | Wipfel et al. |
| 2008/0117909 A1 | 5/2008 | Johnson |
| 2008/0130517 A1 | 6/2008 | Lee et al. |
| 2008/0148341 A1 | 6/2008 | Ferguson |
| 2008/0155223 A1 | 6/2008 | Hiltgen et al. |
| 2008/0186875 A1 | 8/2008 | Kitani |
| 2008/0192648 A1 | 8/2008 | Galles |
| 2008/0205377 A1 | 8/2008 | Chao et al. |
| 2008/0212592 A1 | 9/2008 | Wybenga et al. |
| 2008/0219184 A1 | 9/2008 | Fowler et al. |
| 2008/0225853 A1 | 9/2008 | Melman et al. |
| 2008/0228781 A1 | 9/2008 | Chen et al. |
| 2008/0240104 A1 | 10/2008 | Villait et al. |
| 2008/0240122 A1 | 10/2008 | Richardson et al. |
| 2008/0244579 A1 | 10/2008 | Muller |
| 2008/0259934 A1 | 10/2008 | Matthews et al. |
| 2008/0270564 A1 | 10/2008 | Rangegowda et al. |
| 2009/0013062 A1 | 1/2009 | Blatherwick et al. |
| 2009/0025007 A1 | 1/2009 | Hara et al. |
| 2009/0037680 A1 | 2/2009 | Colbert et al. |
| 2009/0052461 A1 | 2/2009 | Brown et al. |
| 2009/0083445 A1 | 3/2009 | Ganga |
| 2009/0106409 A1 | 4/2009 | Murata |
| 2009/0106766 A1 | 4/2009 | Masuda |
| 2009/0109479 A1 | 4/2009 | Kato |
| 2009/0135816 A1 | 5/2009 | Nandagopal et al. |
| 2009/0150529 A1 | 6/2009 | Tripathi |
| 2009/0157701 A1 | 6/2009 | Lahiri et al. |
| 2009/0190598 A1 | 7/2009 | Christensen et al. |
| 2009/0198761 A1 | 8/2009 | Nanda et al. |
| 2009/0240790 A1 | 9/2009 | Utsunomiya et al. |
| 2009/0274044 A1 | 11/2009 | Goose et al. |
| 2009/0276772 A1 | 11/2009 | Garrett et al. |
| 2009/0276774 A1 | 11/2009 | Kinoshita |
| 2009/0292858 A1 | 11/2009 | Lambeth et al. |
| 2009/0307597 A1 | 12/2009 | Bakman |
| 2009/0313620 A1 | 12/2009 | Sedukhin et al. |
| 2010/0027420 A1 | 2/2010 | Smith |
| 2010/0042708 A1 | 2/2010 | Stamler et al. |
| 2010/0042719 A1 | 2/2010 | Kinoshita |
| 2010/0043068 A1 | 2/2010 | Varadhan et al. |
| 2010/0050172 A1 | 2/2010 | Ferris |
| 2010/0054129 A1 | 3/2010 | Kuik et al. |
| 2010/0077158 A1 | 3/2010 | Asano |
| 2010/0091961 A1 | 4/2010 | Jones et al. |
| 2010/0128605 A1 | 5/2010 | Chavan et al. |
| 2010/0131636 A1* | 5/2010 | Suri et al. ...................... 709/224 |
| 2010/0165876 A1* | 7/2010 | Shukla et al. ................. 370/254 |
| 2010/0165877 A1 | 7/2010 | Shukla et al. |
| 2010/0169467 A1 | 7/2010 | Shukla et al. |
| 2010/0214949 A1* | 8/2010 | Smith et al. ................... 370/254 |
| 2011/0019550 A1 | 1/2011 | Bryers et al. |
| 2011/0096781 A1 | 4/2011 | Aybay |

OTHER PUBLICATIONS

U.S. Appl. No. 12/346,612, filed Dec. 30, 2008, entitled "Methods and Apparatus Related to Data Transmissions Between Virtual Resources at a Host Device" (78 pgs).

U.S. Appl. No. 12/346,615, filed Dec. 30, 2008, entitled "Methods and Apparatus for Routing Between Virtual Resources Based on a Routing Location Policy" (79 pgs).

U.S. Appl. No. 12/346,618, filed Dec. 30, 2008, entitled "Methods and Apparatus for Provisioning at a Network Device in Response to a Virtual Resource Migration Notification" (80 pgs).

U.S. Appl. No. 12/346,625, filed Dec. 30, 2008, entitled "Methods and Apparatus Related to Managing Communications Between Virtual Resources" (43 pgs).

CISCO: "Cisco VN-Link: Virtualization-Aware Networking," Cisco Public Information, Cisco Systems, [Online] Mar. 1, 2009 (pp. 1-10), XP002593596, Retrieved from the Internet: <URL: http://www.cisco.com/en/US/solutions/collateral/ns340/ns517/ns224/ns894/white_paper_c11-525307.pdf>.

U.S. Appl. No. 12/976,508, filed Dec. 22, 2010, entitled "Methods and Apparatus for Tunnel Management Within a Data Center" (42 pgs).

U.S. Appl. No. 12/981,678, filed Dec. 30, 2010, entitled "Apparatus, Systems and Methods for Aggregate Routes Within a Communications Network" (38 pgs).

Office Action mailed Dec. 23, 2010 for U.S. Appl. No. 12/346,623 (19 pages).

Office Action mailed Jun. 16, 2011 for U.S. Appl. No. 12/346,623 (13 pages).

Office Action mailed Sep. 17, 2010 for U.S. Appl. No. 12/346,608 (28 pages).

Office Action mailed Apr. 14, 2011 for U.S. Appl. No. 12/346,608 (24 pages).

Final Office Action mailed Jul. 26, 2011 for U.S. Appl. No. 12/346,608 (30 pages).

Office Action mailed Jan. 17, 2012 for U.S. Appl. No. 12/346,608 (29 pages).

Office Action mailed Sep. 15, 2010 for U.S. Appl. No. 12/346,615 (21 pages).

Office Action mailed Mar. 21, 2011 for U.S. Appl. No. 12/346,615 (9 pages).

Office Action mailed Sep. 15, 2010 for U.S. Appl. No. 12/346,618 (13 pages).
Office Action mailed Apr. 7, 2011 for U.S. Appl. No. 12/346,618 (14 pages).
Office Action mailed Sep. 17, 2010 for U.S. Appl. No. 12/346,625 (24 pages).
Office Action mailed Mar. 29, 2011 for U.S. Appl. No. 12/346,625 (13 pages).
Final Office Action mailed Dec. 14, 2011 for U.S. Appl. No. 12/346,625 (14 pages).
Office Action mailed Jul. 3, 2012 for U.S. Appl. No. 12/346,625 (14 pages).
Office Action mailed Oct. 28, 2010 for U.S. Appl. No. 12/346,630 (24 pages).
Office Action mailed Apr. 27, 2011 for U.S. Appl. No. 12/346,630 (15 pages).
Final Office Action mailed Oct. 26, 2011 for U.S. Appl. No. 12/346,630 (17 pages).
Office Action mailed Oct. 5, 2010 for U.S. Appl. No. 12/346,632 (16 pages).
Office Action mailed Mar. 14, 2011 for U.S. Appl. No. 12/346,632 (21 pages).
Final Office Action mailed Aug. 15, 2011 for U.S. Appl. No. 12/346,632 (23 pages).
Office Action mailed Dec. 21, 2011 for U.S. Appl. No. 12/346,632 (27 pages).
Office Action mailed Jun. 26, 2012 for U.S. Appl. No. 12/607,162 (20 pages).
Office Action mailed Apr. 1, 2011 for U.S. Appl. No. 12/346,612 (19 pages).
Final Office Action mailed Dec. 5, 2011 for U.S. Appl. No. 12/346,612 (24 pages).
Partial European Search Report mailed Mar. 4, 2011 for European Application No. 10187574.8 (6 pages).
Extended European Search Report mailed Aug. 17, 2011 for European Application No. 10187574.8 (10 pages).
Partial European Search Report dated Feb. 4, 2011 for European Application No. 10188736.2 (6 pages).
Extended European Search Report dated May 10, 2011 for European Application No. 10188736.2 (10 pages).

* cited by examiner

METHODS AND APPARATUS FOR CONFIGURING A VIRTUAL NETWORK SWITCH

BACKGROUND

One or more embodiments relate generally to virtual network switches. More specifically, one or more embodiments relate to distributed switching including distributing to virtual network switches network rules based on configuration files related to access switches.

Known virtualized computer systems can host multiple virtual computer systems at a single physical computing device such as a personal computer or a computer server. Such virtualized computer systems can include a hypervisor that provides an interface via which the multiple virtual computer systems (also referred to as virtual machines) can share the hardware resources such as a processor, a memory, a hard or solid-state drive, and a network interface.

Some known virtualized computer systems implement a virtual or soft switch between the physical network interface and the multiple virtual computer systems. When any of the multiple virtual computer systems communicate one with another, they can communicate within the single physical computing device via the virtual switch. In other words, network traffic with a source and destination within the single physical computing device do not exit the physical computer system. This can produce advantageous results such as reduced network traffic at the external communications network to which the physical computer device is connected via the physical network interface and reduced network congestion at the physical network interface. Such methods, however, typically fail to provide consistency in security, visibility, management, and/or fault resolution with the external communications network and the network elements (e.g., routers, switches, and management entities) of the external communications network.

For example, known virtual switches within virtualized computer systems fail to implement many of the features, functionalities, and/or mechanisms of the network elements of the external communication network (also referred to as external network elements). For example, known virtual switches typically fail to implement rules, filters, access control lists ("ACLs"), mirroring capabilities, intrusion detection, counters, flow tables, and other features or mechanisms of the external network elements. Thus, network traffic within the virtualized computer system is processed or handled differently than network traffic at the external communications network to which the physical computer system is connected, resulting in inconsistent handling of network traffic and possible security, accounting, and management degradation.

SUMMARY

In one embodiment, a method includes sending a configuration signal to a virtual network switch module within a control plane of a communications network. The configuration signal is configured to define a first network rule at the virtual network switch module. The method also includes configuring a packet forwarding module such that the packet forwarding module implements a second network rule, and receiving status information from the virtual network switch module and status information from the packet forwarding module. The status information is received via the control plane.

DETAILED DESCRIPTION

Figure 1:
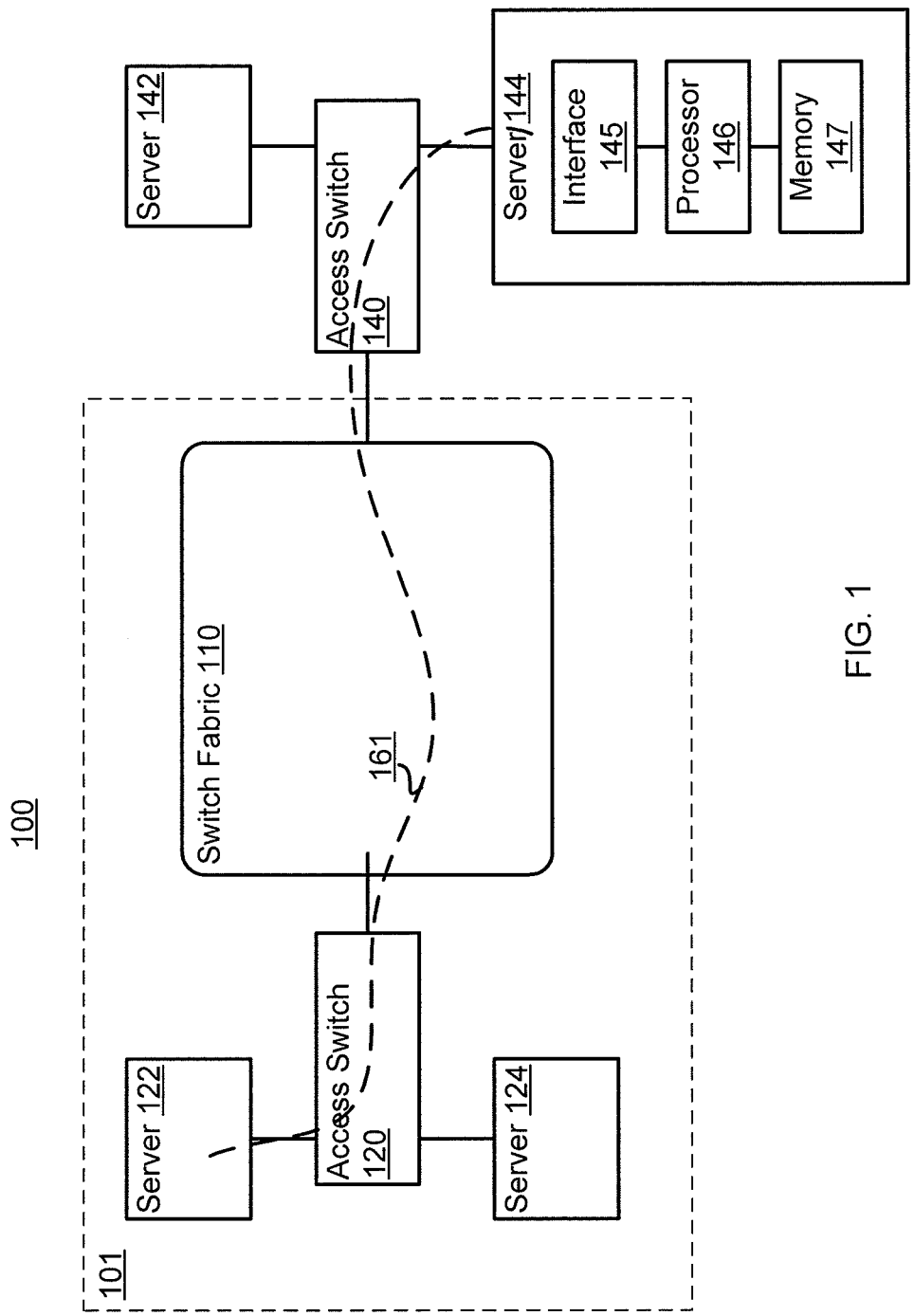
FIG. 1 is a system block diagram of a network including a switch fabric, according to an embodiment.

One or more embodiments can provide distributed processing of network traffic within one or more virtualized computer systems at one or more virtual switches within the one or more virtualized computer systems. In some embodiments, the distributed processing is substantially consistent with processing of network traffic at network elements of a communications network to which the virtualized computer systems are operatively coupled. For example, a computer server (or server) is configured to host a group of virtual computer devices or virtual machines (also referred to as virtual network devices) and is operatively coupled to a communications network via a switch (such as an access switch or edge device operatively coupled to a switch fabric). The virtual machines can communicate with other computer devices operatively coupled to the communications network (also referred to as network devices because they are operatively coupled to a communications network) via a virtual switch hosted at the computer server and a network interface of the computer server. Additionally, the virtual machines within a given computer server can communicate one with another via the virtual switch.

The switch to which the computer server is operatively coupled can detect the presence of the computer server and virtual switch, and configure the virtual switch with one or more network rules defined, for example, in a configuration file received at the switch. In some embodiments, the switch can be an access switch operatively coupled to a switch fabric such as a multi-stage switch fabric. The configuration file includes configuration information related to rules, filters, access control lists ("ACLs"), mirroring capabilities, intrusion detection, counters, flow tables, and/or other features or mechanisms of the switch. Additionally, the configuration file can include parameters such as default values, maximum and minimum limits, and/or other parameters related to the features or mechanisms of the configuration file. These features and mechanisms (also referred to herein generically as network rules) can be applied to the virtual switch such that the virtual switch processes network traffic (e.g., data packet or data cells) in a manner consistent or substantially identical to the manner in which the switch processes network traffic. In other words, the virtual switch can be configured by the switch to implement network rules based on the configuration file used by the switch. Thus, the switch (or processing module related to a configuration used by the switch) can be distributed between the switch and the virtual switch.

To communicate with a network device, a virtual machine at (or within) a computer server sends a data packet to the virtual switch at that computer server, and the virtual switch determines whether the virtual switch includes a network rule related to that data packet. For example, a network rule can be related to a source network device or destination network device identified by a field of the data packet. If the virtual switch includes such a network rule, the virtual switch processes the data packet and then sends the data packet to the communications network via the network interface of the computer server. To communicate with another virtual machine at the computer server, a virtual machine sends a data packet to the virtual switch, and the virtual switch processes the data packet and then sends or forwards the data packet to the other virtual machine. If the virtual switch does not include such a network rule, the virtual switch forwards the data packet to the switch, and the switch processes the data packet. In either case, the data packet is processed in a manner consistent with that the configuration used by the switch.

In some embodiments, the switch can send network rules to the virtual switch proactively (e.g., on a connection or a session basis). For example, network rules can be sent to the virtual switch after the switch detects the virtual switch, but before data packets are sent to the switch from the virtual switch. In some embodiments, the switch can send network rules to the virtual switch reactively. For example, the virtual switch can request network rules after the virtual switch receives a data packet from the switch with a destination of a virtual machine hosted at the computer server. In some embodiments, the switch can send network rules to the virtual switch on a per-packet basis. For example, rules, filters, ACLs, and/or other configuration information related to a data packet (or to one or more data fields of a data packet) received from a virtual switch are sent by the switch to the virtual switch after that data packet is received at the switch.

Furthermore, the switch can include specialized hardware components such as high-speed memories, application specific integrated circuits ("ASICs"), and/or field programmable gate arrays ("FPGAs") that can process a data packet based on one or more features or mechanisms described within a configuration file faster or more efficiently than a virtual switch. In some embodiments, a virtual switch can determine that a switch can process a data packet more efficiently (e.g., faster or using less power or energy), and can forward the data packet to that switch for processing.

As used in this specification, the singular forms "a," "an" and "the" include plural referents unless the context clearly dictates otherwise. Thus, for example, the term "a software module" is intended to mean a single software module or multiple software modules; and "memory" is intended to mean one or more memories, or a combination thereof.

As used in this specification, the term switch or network switch can describe one or more of elements of a communications network (or network elements) that are configured or configurable to process network traffic such as data packet or data cells within a communications network. For example, a switch can be a layer 2 (of the Open Systems Interconnection ("OSI") model) switch or router, a layer 3 (of the OSI model) switch or router, a network hub, a network bridge, a network gateway, and/or any other network element that processes network traffic or executes actions based on contents or data fields of network traffic. Similarly, a switch can be a computing device such as a computer server configured to function as a switch. In some embodiments, a switch can be a software module hosted at a computer server and can be referred to as a virtual switch.

FIG. 1 is a system block diagram of network 100 including switch fabric 110, according to an embodiment. As illustrated in FIG. 1, network 100 includes switch fabric 110, access switch 120, access switch 140, server 122, server 124, server 142, and server 144. Switch fabric 110 is operatively coupled to access switch 120 and access switch 140. Server 122 and server 124 are operatively coupled to switch fabric 110 via access switch 120. Server 142 and server 144 are operatively coupled to switch fabric 110 via access switch 140. Server 122, access switch 120, server 124, and switch fabric 110 are included in the portion of network 100 labeled 101. Network portion 101 is discussed in more detail in relation to FIG. 4.

Network 100 is configured such that servers 122, 124, 142, and 144 can communicate one with another via access switch 120, access switch 140 and switch fabric 110. For example, as illustrated by data path 161, server 122 can send a data packet addressed to server 144 to access switch 120. Access switch 120 can forward the data packet to access switch 140 via switch fabric 110. Access switch 140 can then forward the data packet to server 144. In some embodiments, access switches 120 and access switch 140 are configured to classify data packets received from servers 122 and 124, and servers 142 and 144, respectively.

As illustrated in FIG. 1, server 144 includes processor 146, interface 145 and memory 147. Server 144 is operatively coupled to switch fabric 110 via interface 145. Interface 145 can be any interface configurable to be operatively coupled to switch fabric 110. For example, an interface can be an Ethernet interface, a broadband interface, a fiber-optic interface, and/or a telephony interface. An interface can also be, for example, a wireless interface such as a worldwide interoperability for microwave access ("WiMAX") interface, a high-speed packet access ("HSPA") interface, and/or a wireless local area network ("WLAN") interface.

Processor 146 is operatively coupled to interface 145 (also referred to as a network interface) such that processor 146 can be configured to be in communication with switch fabric 110 and/or one or more of servers 122, 124, and 142 (or a processor at each of servers 122, 124, and 144) via interface 145. Processor 146 can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules in programming languages as Java™, C++, C, assembly, a hardware description language, or any other suitable programming language. A processor according to some embodiments includes media and computer code (also can be referred to as code) specially designed and constructed for the specific purpose or purposes.

Additionally, processor 146 can be a group of processors and/or processing (or execution) cores. For example, a processor can be a single physical processor having a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled one to another via a communications network. Said differently, a processor can be a group of distributed processors in communication with one another via a communications network. In some embodiments, a processor can be a combination of such processors. For example, a processor can be a group of distributed computing devices, where each computing device includes a group of physical processors sharing a memory bus and each physical processor includes a group of processing cores.

Processor 146 is also operatively coupled to memory 147. Memory 147 can be a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

In addition to memory 147, some embodiments include another processor-readable medium, for example a database accessible to server 144, (not shown in FIG. 1) having instructions or computer code thereon for performing various processor-implemented operations including, for example, processing data packets and/or providing an interface for access to digital documents such as data files. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; solid-state memory such as SSDs and FLASH memory; and ROM and RAM devices. Examples of computer code include, but are not limited to, micro-code or micro-instructions, machine instructions (such as produced by a compiler), and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

In some embodiments, servers 122, 124, 142 and/or elements of switch fabric 110 (e.g., components, modules, systems, subsystems, or assemblies) each include an interface, a processor and a memory similar to those discussed in relation to server 144. For example, an access switch, a routing engine, and/or other computing devices operatively coupled to or in communication with servers 122, 124, 142 and/or 144 or access switches 120 and/or 140 such as a computer terminal and/or a portable or handheld device (e.g., cellular telephone device or portable/mobile internet device) can include an interface, a processor and a memory.

Switch fabric 110 can include multiple stages and can be referred to as a multi-stage switch fabric. Additionally, switch fabric 110 can include various elements or computing devices such as ingress and egress ports and/or queues, input and output modules, packet classification modules, routing engines or modules, switch controllers, and/or other elements configured to manage or control switch fabric 110 and/or data transmitted via (or through) switch fabric 110. Such elements can be implemented as software modules hosted at one or more processor and resident within (or stored at) a memory operatively coupled to the one or more processors. Alternatively, such elements can be implemented as hardware modules such as application-specific integrated circuits and/or field-programmable gate arrays. In some embodiments, such elements can be implemented as a combination of software modules and hardware modules. In some embodiments, one or more elements of a switch fabric can be resident or hosted at access switches 120 and/or 140.

Switch fabric 110 can include a data plane in which data signals (e.g., data packets sent between servers 122 and 124 and servers 142 and 144) are transmitted through switch fabric 110 and a control plane in which control signals (e.g., routing information related to data signals and state information related to one or more stages or elements of switch fabric 110) are transmitted within switch fabric 110.

In some embodiments, servers 122 and 124, servers 142 and 144 communicate with access switches 120 and 140, respectively, via one protocol, and access switches 120 and 140 can communicate with switch fabric 110 via another protocol. For example, servers 122 and 124, and 142 and 144 can communicate with access switches 120 and 140, respectively, via an Ethernet protocol; access switches 120 and 140 can communicate with switch fabric 110 via a cell-based switching protocol (e.g., using fixed-length or variable-length cell switching). In other words, in some embodiments access switches 120 and 140 can operate as gateways between servers and/or other devices (e.g., network attached storage devices or storage area network devices) communicating via one protocol in a network and with switch fabric 110 communicating via another protocol. In some embodiments, one or more of access switches 120 and 140 can be elements (or part) of switch fabric 110 and can be referred to as edge devices (or elements) of switch fabric 110.

In some embodiments, access switches 120 and 140 are configured to classify data packets received from server 122 and 124, and servers 142 and 144, respectively, before forwarding the data packets to determine whether any processing is appropriate for the data packets. For example, access switches 120 and 140 can include a packet classification module configured to classify data packets received by access switches 120 and 140 from servers 122 and 124 and severs 142 and 144, respectively. In some embodiments, data packet classification can include determining whether a portion of a data packet satisfies a condition included in a policy such as, for example, a firewall policy, a routing policy, and/or an access control list ("ACL"). In some embodiments, a processing action (also referred to herein as an action) can be related to a condition in the policy, and access switches 120 and 140 are configured to execute (or perform) that action if the related condition is satisfied during packet classification. Actions can include, for example, modifying one or more parameters of a data packet, accessing a database (not shown) to determine routing information related to a data packet and/or destination of a data packet, dropping a packet, and/or other actions relative to the data packet. In some embodiments, data cells are defined based on data packets received at access switch 120, the data cells are forwarded through switch fabric 110 to access switch 140, and the data packets are reassembled based on the data cells and can be forwarded to, for example, one or more of servers 142 and/or 144.

In some embodiments, multiple actions can be related to a single condition. For example, if a condition is satisfied, access switch 120 can modify a time-to-live ("TTL") value in a data packet received from server 122 and can access a database to determine routing information related to or associated with the data packet. In some embodiments, an action can be dependent on another action defining a condition. Said differently, an action can be executed in response to a condition being satisfied by a data packet during packet classification, and that action can define a secondary (or supplemental) classification condition. If the secondary classification condition is satisfied, another action is executed. For example, a data packet received by access switch 140 from server 144 can be classified based on a condition (referred to as a primary classification condition, or primary condition) defining a longest prefix match of a destination Internet Protocol ("IP") address of the packet. Access switch 140 can execute an action triggered by the primary condition where that action defines an additional, supplemental, or secondary classification condition (or secondary condition) such as a match of Transmission Control Protocol ("TCP") flags in the data packet. Access switch 140 can further classify the data packet based on that secondary condition. In other words, if the TCP flags in the data packet satisfy the secondary condition defined in the action, access switch 140 can execute another action relative to the data packet. Thus, the result or outcome of packet classification with a primary classification condition can invoke or trigger packet classification with a secondary classification condition.

In some embodiments, computing devices such as, for example, elements of switch fabric 110, servers 122, 124, 142 and/or 144, and/or other devices can share memory. For example, two or more computing devices can share one or more portions of a memory, and/or two or more software modules (e.g., processes, threads, contexts, or applications) or hardware modules within a computing device can share one or more portions of a memory. In other words, one or more software modules and/or hardware modules can access a portion of a memory. For example, a routing engine and a classification module within switch fabric 110 can both access a data packet or cell stored at a single portion of a memory. Thus, the data packet can be stored at one memory and accessed by multiple elements of switch fabric 110. In some embodiments, a routing engine and/or a classification module can be hosted at access switches 120 and/or 140 operatively coupled to switch fabric 110.

Figure 2:
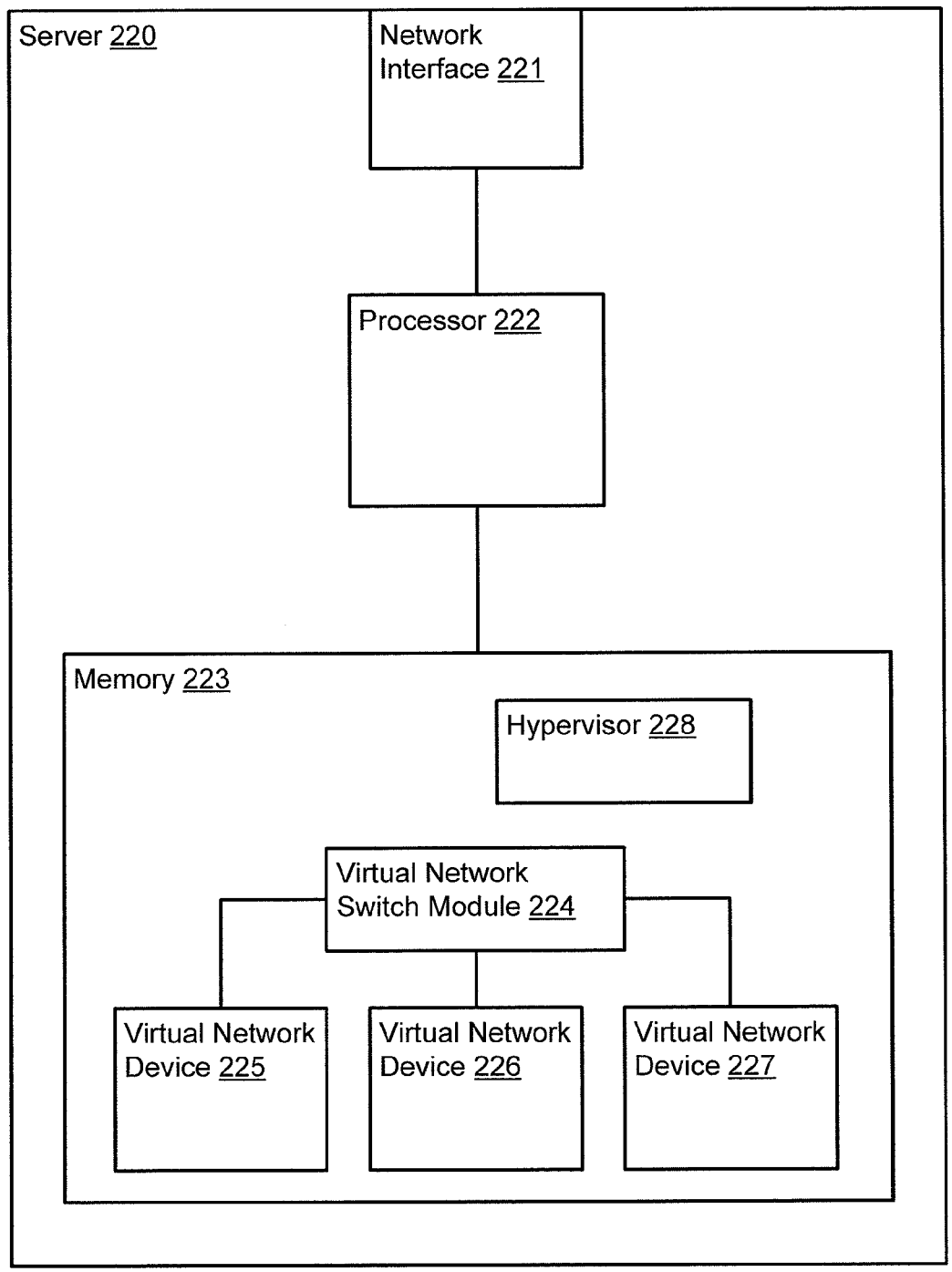
FIG. 2 is an illustration of a server including group of virtual network devices and a virtual network switch module, according to an embodiment.

FIG. 2 is an illustration of a server including group of virtual network devices and a virtual network switch module, according to an embodiment. Server 220 includes network interface 221, processor 222, and memory 223. Processor 222 is operatively coupled to network interface 221 and memory 223. As illustrated in FIG. 2, server 220 can be configured to support, execute, or host multiple virtual network devices, such as virtual network devices 225, 226 and 227. Additionally, server 220 is configured to support, execute, or host virtual network switch 224.

As discussed in more detail here, in some embodiments, virtual network switch module 224 can be configured to function as an access switch or a distributed component of an access switch operatively coupled to the communications network to which network interface 221 is operatively coupled. In other words, virtual network switch module 224 can be provisioned (or configured) by an access switch (not shown in FIG. 2) to apply rules, filters, ACLs, mirroring capabilities, intrusion detection, counters, flow tables, and/or other features or mechanisms with which the access switch (not shown in FIG. 2) directly connected to server 220 via network interface 221 is provisioned. Said differently, virtual network switch module 224 can be configured to implement or apply network rules from a configuration file (e.g., a group of network rules) related to or associated with an access switch to which server 220 is operatively coupled via network interface 221. Thus, virtual network switch module 224 can be configured to process (e.g., switch, route, filter and/or account for) data packets in a manner consistent with or identical to an access switch via which server 220 is operatively coupled to a switch fabric.

Virtual network devices 225, 226 and 227 can be software modules (e.g., collections of code or instructions that can be executed, run, or interpreted at a processor) configured to function substantially similar to other network devices such as, for example, file servers or web servers, and can be referred to as virtual machines. In some embodiments, a network device can be (or a virtual network device can emulate or virtualize) a general purpose computing device such as a personal computer or a computer server. In some embodiments, such a network device can host or execute various software modules or program applications. In some embodiments, a network device can be (or a virtual network device can emulate or virtualize) a specialized computing device such as a web server, a load balancer, a proxy server, a database server, a firewall, a network router, a network switch, and/or some other network appliance.

In some embodiments, virtual network devices 225, 226 and 227 can be servers implemented in software such as, for example, a virtual machine executing at a processor. For example, a virtual network device can be a software module executing in a virtual machine environment such as, for example, a Java™ module executing in a Java™ Virtual Machine ("JVM"), or an operating system executing in a VMware™ virtual machine. In some such embodiments, a network interface, a processor, and a memory can be virtualized and implemented in software executing in, or as part of, a virtual network device.

Virtual network devices 225, 226 and 227 can be stored at memory 223 of server 220, and are executed or hosted at processor 222. In other words, virtual network devices 225, 226 and 227 are resident in memory 223 and share processor 222. Additionally, virtual network devices 225, 226 and 227 can communicate with a communications network such as a multi-stage switch fabric and other network devices and/or virtual network devices operatively coupled to that communications network via network interface 221. For example, network interface 221 can be operatively coupled to an access switch or some other edge device of a switch fabric. In some embodiments, virtual network devices 225, 226 and 227 can communicate with a communications network via virtual network switch module 224 and network interface 221. In other words, network interface 221 can provide or function as a physical connection to the communications network, and virtual network switch module 224 can provide a virtual or virtualized connection to the communications network for virtual network devices 225, 226 and 227. Said differently, virtual network switch module can multiplex and demultiplex communications (e.g., data packets for a packet switching network and data cells for a switch fabric) from virtual network devices 225, 226 and 227 to the communications network and communications from the communications network to virtual network devices 225, 226 and 227, respectively. In some embodiments, the multiplex and demultiplex functions can be level 2 (of the OSI networking model) switching and/or level 3 (of the OSI networking model) routing.

For example, virtual network device 225 can be a file server and server 220 can be operatively coupled to a communications network via network interface 221. Another network device operatively coupled to the communications network can be a client of virtual network device 225. In other words, the network device can request data files accessible at virtual network device 225 via the communications network and network device 225 can provide the requested data files to the network device. More specifically, the network device can send one or more data packets to virtual network device 225 via the communications network to request a data file. The data packets are received at network interface 221 and forwarded to virtual network switch module 224. Virtual network switch module 224 can switch, route, or otherwise forward the data packets to virtual network device 225 based on, for example, one or more parameters, data fields, or portions of the one or more data packets. Additionally, virtual network switch module 224 can process or handle the data packets by applying one or more rules, filters, ACLs, mirroring capabilities, intrusion detection mechanisms, counters, flow tables, and/or other features or mechanisms based on, for example, one or more parameters, data fields, or portions of the data packets. Said differently, virtual network switch module 224 can process in a manner similar to a physical or hardware network switch. Additionally, virtual network switch module 224 can forward data packets to a physical or hardware network switch for processing, for example, if virtual network switch module 224 is not configured with a network rule for those data packets or if the physical or hardware network switch can more efficiently process those data packets.

After virtual network device 225 has received the one or more data packets, virtual network device 225 can access a data file requested by the one or more data packets and send the data file (or a requested portion of the data file) to the network device. More specifically, virtual network device 225 can send a group of packets including the data file to virtual network switch module 224. Virtual network switch module 224 can switch, route, or otherwise forward the group of data packets based on one or more parameters, data fields, or portions of data packets in the group of packets. For example, virtual network switch module 224 can insert or alter a destination address (or other parameter or data field) such as a next hop destination address of a data packet based on a forwarding (or switching or routing) table accessible to virtual network switch module 224, and then forward the group of data packets to the communications network via network interface 221. Additionally, virtual network switch module 224 can process or handle the data packets by applying one or more rules, filters, ACLs, mirroring capabilities, intrusion detection mechanisms, counters, flow tables, and other features or mechanisms based on, for example, one or more parameters, data fields, or portions of the data packets.

Similarly, virtual network switch module 224 can switch, route, or otherwise forward data packets to and from virtual network devices 226 and 227 such that virtual network devices 225, 226 and 227 can each communicate via network interface 221 with other network devices operatively coupled to the communications network. Said differently, each of virtual network devices 225, 226 and 227 can be operatively coupled to virtual network switch module 224 such that each of virtual network devices 225, 226 and 227 can communicate via virtual network switch module 224 with network devices operatively coupled to a communications network to which server 220 is also operatively coupled via network interface 221. Additionally, virtual network switch module 224 can process or handle the data packets by forwarding the data packets to a physical or hardware network switch for processing. In some embodiments, virtual network switch module 224 can apply one or more rules, filters, ACLs, mirroring capabilities, intrusion detection mechanisms, counters, flow tables, and other features or mechanisms based on, for example, one or more parameters, data fields, or portions of the data packets before forwarding the data packets. Thus, data packets sent from and/or received at virtual network devices 225, 226 and 227 at server 220 can be processed and/or accounted for in a manner consistent with a configuration file related to physical or hardware network switches within a communications network to which server 220 is operatively coupled via network interface 221. In some embodiments, the rules and/or filters are not applied if the destination of the data packet is not one or more of virtual network devices 225, 226 and 227. In other words, if the destination is external to server 220, the data packet can be forwarded via network interface 221 to an access switch or other switching (or forwarding) device.

As illustrated in FIG. 2, server 220 includes hypervisor 228. Similar to virtual network devices 225, 226 and 227, hypervisor 228 (or data and instructions related to hypervisor 228) is stored at memory 223 and can be hosted at processor 222. Hypervisor 228 can be a software module such as an application program or service within or at server 220 configured to manage virtual network devices and/or one or more virtual network switch modules at server 220. For example, hypervisor 228 can provision or configure virtual network switch module 224 to communicate with virtual network devices 225, 226 and/or 227. Additionally, hypervisor 228 can instantiate, suspend, monitor, and/or otherwise manage virtual network devices 225, 226 and 227. Furthermore, hypervisor 228 can coordinate (e.g., with one or more hypervisors at other servers) migration of virtual network devices to and from server 220.

Figure 3:
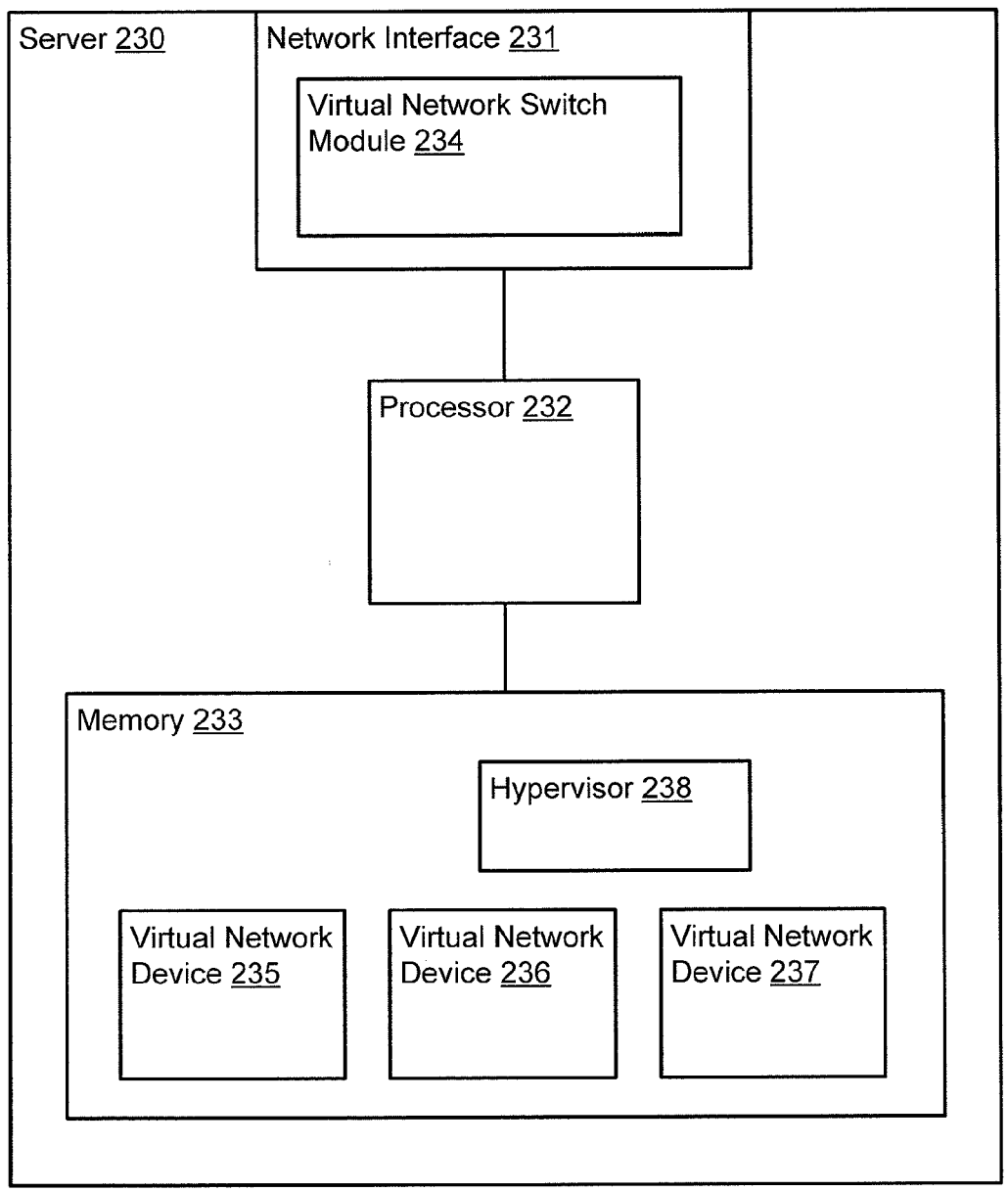
FIG. 3 is an illustration of a server including a group of virtual network devices and a virtual network switch module, according to another embodiment.

FIG. 3 is an illustration of a server including a group of virtual network devices and a virtual network switch module, according to another embodiment. Similar to server 220 illustrated in FIG. 2, server 230 includes network interface 231, processor 232, and memory 233. Processor 232 is operatively coupled to network interface 231 and memory 233. As illustrated in FIG. 3, server 230 can be configured to support, execute, or host multiple virtual network devices, such as virtual network devices 235, 236 and 237. Additionally, server 230 is configured to support, execute, or host virtual network switch 234 at network interface 231. Said differently, network interface 231 (e.g., a network interface card) can be configured to host virtual network switch module 234.

Virtual network devices 235, 236 and 237 are substantially similar to virtual network devices 225, 226 and 227 discussed in relation to FIG. 2. Additionally, virtual network switch module 234 is substantially similar in function to virtual network switch module 224 discussed in relation to FIG. 2. Rather than being resident at memory 233 and executed at processor 232, however, virtual network switch module 234 is resident at a memory (not shown) of network interface 231 and executed at a processor (not shown) of network interface 231. In some embodiments, network interface 231 can include specialized hardware components or elements such as, for example, ASICs and/or FPGAs configured to host one or more virtual network switch modules. In other words, virtual network switch module 234 can be hosted at one or more specialized hardware devices or components within or operatively coupled to network interface 231.

In some embodiments, virtual network devices 235, 236 and 237 can communicate one with another via virtual network switch module 234. For example, virtual network switch module 235 can send a data packet to virtual network switch module 234 via processor 232 or, for example, a direct memory access ("DMA") controller and/or memory bus. Virtual network switch module 234 can receive the data packet and can apply one or more rules to the data packet to determine a destination network device such as, for example, virtual network device 237 based on one or more rules applied to the data fields of the data packet. Additionally, virtual network switch module 234 can apply one or more network filters to the data packet and execute actions based on the results of a filter. For example, virtual network switch module 234 can drop or discard the data packet, forward the data packet to one or more additional destinations, increment and/ or decrement one or more counters or indexes, and/or take some other action based on the results of a filter applied to the data fields of the data packet. In some embodiments, the rules and/or filters are the same or substantially similar rules and/or filters applied at an access switch to a switch fabric operatively coupled to network interface 231. In some embodiments, the rules and/or filters are not applied if the destination of the data packet is not one or more of virtual network devices 235, 236 and 237. In other words, if the destination is external to server 230, the data packet can be forwarded via network interface 231 to an access switch or other switching (or forwarding) device. Furthermore, additional features and/or mechanisms of an access switch such as ACLs, mirroring capabilities, intrusion detection mechanisms, counters, and/or flow tables can be applied to the data packet.

After any rules and/or filters have been applied to the data packet at virtual network switch module 234, the data packet can be forwarded to the destination determined at virtual network switch module 234. If the destination is one of virtual network devices 235, 236 or 237, the data packet can be forwarded to that virtual network device via processor 232 or, for example, a direct memory access ("DMA") controller and/or memory bus. Thus, in some embodiments, the same rules and/or filters that are applied at an access switch or other forwarding device (e.g., network switch or network router) operatively coupled to server 230 can be applied to data packets that are sent from one virtual network device hosted at server 230 to another virtual network device hosted at server 230 at virtual network switch module 234. In other words, those data packets can be processed and/or accounted for at virtual network switch module 234 in a manner consistent with processing and accounting of data packets at an access switch (or other forwarding device) without having been sent to that access switch. If the destination is a network device (e.g., a server or virtual network device hosted at another server) external to server 230, the data packet can be forwarded to an access switch to which network interface 231 is operatively coupled. That access switch can similarly apply rules and/or filters to the data packet and forward the data packet (e.g., via a switch fabric to which the access switch is operatively coupled) to that destination.

As illustrated in FIG. 3, server 230 includes hypervisor 238. Similar to virtual network devices 235, 236 and 237, hypervisor 238 (or data and instructions related to hypervisor 238) is stored at memory 233 and can be hosted at processor 232. Hypervisor 238 can be a software module such as an application program or service within or at server 230 configured to manage virtual network devices and/or one or more virtual network switch modules at server 230. For example, hypervisor 238 can provision or configure virtual network switch module 234 to communicate with virtual network devices 235, 236 and/or 237. Additionally, hypervisor 238 can instantiate, suspend, monitor, and/or otherwise manage virtual network devices 235, 236 and 237. Furthermore, hypervisor 238 can coordinate (e.g., with one or more hypervisors at other servers) migration of virtual network devices to and from server 230.

Figure 4:
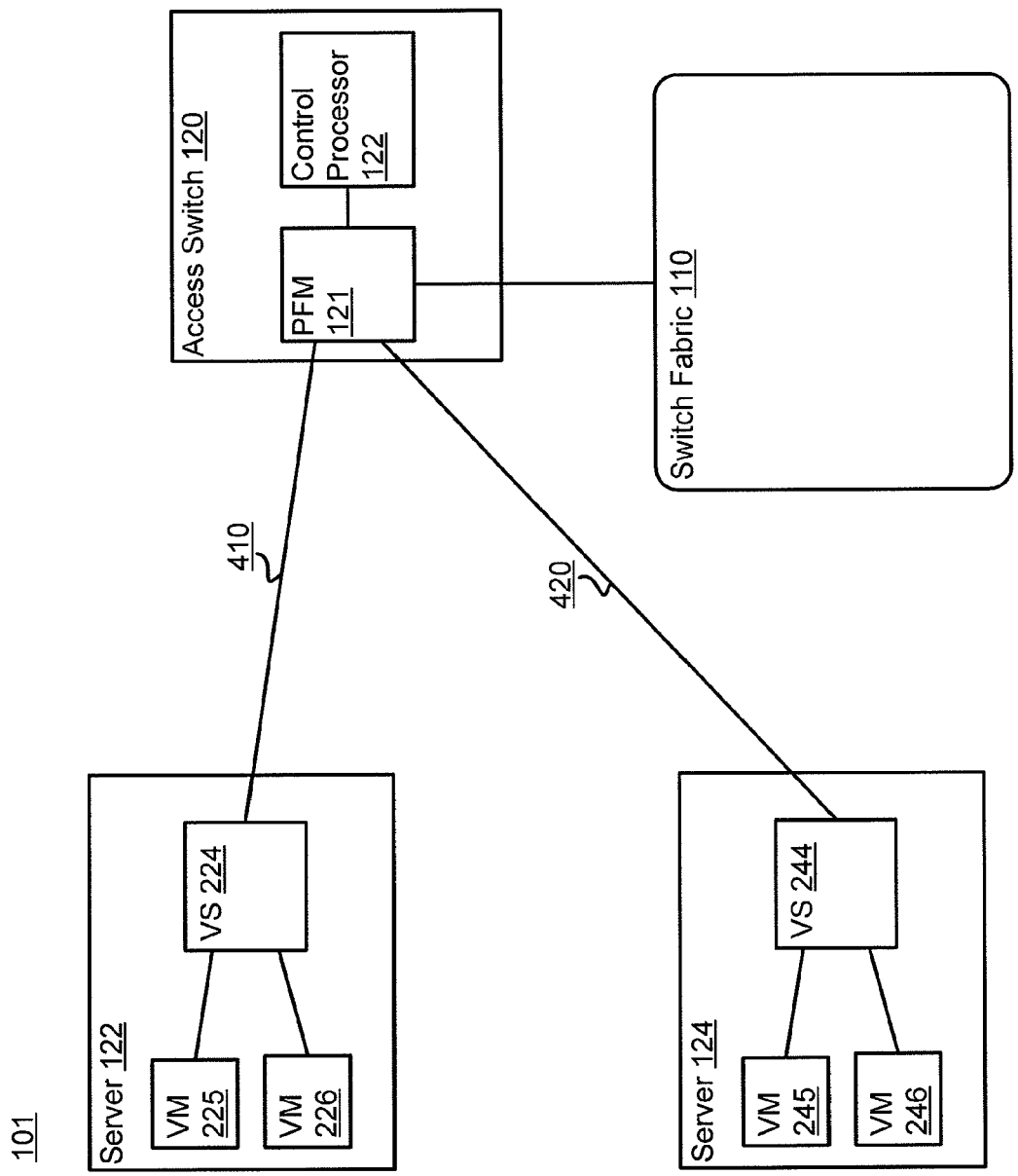
FIG. 4 is a system block diagram of a portion of a network including a switch fabric, according to an embodiment.

FIG. 4 is a system block diagram of network portion 101 of network 100 including switch fabric 110, according to an embodiment. Network portion 101 includes servers 122 and 124, access switch 120, and switch fabric 110. Server 122 is operatively coupled to access switch 120 via cable 410, and server 124 is operatively coupled to access switch 120 via cable 420. Cables 410 and 420 can be network cables such as twisted-pair wire cables, fiber optic cables, and/or some other cables.

Server 122 includes virtual network switch module (also referred to as a virtual switch) VS 224 and virtual network devices (also referred to as virtual machines) labeled VM 225 and VM 226. VM 225 and VM 226 are in communication with VS 224. Similarly, server 124 includes virtual network switch module (also referred to as a virtual switch) VS 244 and virtual network devices (also referred to as virtual machines) labeled VM 245 and VM 246. VM 245 and VM 246 are in communication with VS 244. VM 225, VM 226, VM 245, and VM 246 function substantially similar to virtual network devices described in relation to FIGS. 2-3. Additionally, VS 224 and VS 244 function substantially similar to virtual network switch modules described in relation to FIGS. 2-3.

Access switch 120 includes a packet forwarding module PFM 121 and control processor 122 operatively coupled to PFM 121. PFM 121 is a hardware and/or software module (or a collection of such modules) configured to apply network rules (e.g., rules, filters, access control lists ("ACLs"), mirroring capabilities, intrusion detection, counters, flow tables, default values, maximum and minimum limits, and/or other packet switching, forwarding, accounting, or management features or mechanisms defined in a configuration file) to data packets received (e.g., from servers, virtual network devices or a switch fabric). In some embodiments, PFM 121 can include specialized hardware and/or software configured to provide high-speed processing of that data packet. As an example, PFM 121 can include purpose-built hardware (e.g., an ASIC) to provide high-speed classification of data packets.

Control processor 122 is configured to control and/or manage data packet switching and forwarding at PFM 121, VS 224, and VS 244. For example, control processor 122 can receive and interpret a configuration file related to access switch 120 and provide configuration instructions to PFM 121, VS 224, and VS 244 related to network rules defined or included within in the configuration file. In other words, control processor 122 can configure PFM 121, VS 224, and/or VS 244 to implement network rules. In some embodiments, cables 410 and 420 can transmit data (e.g., data packets to and from servers 122 and/or 124 and access switch 120) and control signals (e.g., control or management instructions from control processor 122 to VS 224 and/or VS 244 and status or other reporting information from VS 224 and/or VS 244 to access switch 120). Said differently, control processor 122 can communicate bi-directionally with VS 224 and/or VS 244. In some embodiments, control and data signals are transmitted across cables 410 and/or 420 in separate or different tunnels. For example, control signals can be transmitted or communicated as part of one virtual local area network ("VLAN") and data signals can be transmitted in another VLAN. In some embodiments, data signals can be transmitted in-band and control signals can be transmitted out-of-band. In other embodiments, other channels or tunnels can be used to transmit data and control signals separately.

For example, access switch 120 can receive a configuration file from a network management entity (not shown). Control processor 122 can interpret the configuration file and configure PFM 121, VS 224, and VS 244 to implement the configuration file. For example, control processor 122 can write to and/or read registers or memory of PFM 121 to configure PFM 121 to implement complex network rules (e.g., filters including numerous terms or processing steps for which PFM 121 is optimized), and can write to and/or read registers or memory of VS 224 and/or VS 244 to configure VS 224 and/or VS 244 to implement other network rules that use fewer processing resources. In other words, control processor 122 can directly manipulate memory and registers (or the data values stored at memory and registers) of VS 224, VS 244, and/or PFM 121 to define, implement, or establish network rules at VS 224, VS 244, and/or PFM 121.

Alternatively, control processor 122 can send control (or configuration) instructions (or signals) including descriptions or definitions of particular network rules to PFM 121, VS 224, and/or VS 244. PFM 121, VS 224, and/or VS 244 can interpret the control instructions, and write to and/or read registers or memory to configure PFM 121, VS 224, and/or VS 244, respectively, to implement the network rules. Control instructions can be transmitted or communicated to PFM 121, VS 224, and/or VS 244 via control signals within a control plane of a communications network such as a switch fabric. Said differently, control processor 122 can directly or indirectly manipulate memory and registers (or the data values stored at memory and registers) of VS 224, VS 244, and/or PFM 121 to define, implement, or establish network rules at VS 224, VS 244, and/or PFM 121.

In some embodiments, control instructions including description of network rules and/or read and/or write instructions related to memory and/or registers can be sent from control processor 122 to VS 224 and/or VS 244 via PFM 121. In other words, PFM 121 can forward control instructions from control processor 122 to VS 224 and/or VS 244. In some embodiments, PFM 121 and control processor 122 can be operatively coupled based on a protocol, and VS 224 and VS 244 can be operatively coupled to PFM 121 based on that same protocol. For example, control processor 122 and FPE 121 can be operatively coupled using an Ethernet connection, and VS 224 and VS 244 can be operatively coupled to PFM 121 using an Ethernet connection. In some embodiments, PFM 121 and control processor 122 can be operatively coupled based on a protocol, and VS 224 and VS 244 can be operatively coupled to PFM 121 based on a different protocol. For example, control processor 122 and FPE 121 can be operatively coupled using an Ethernet connection, and VS 224 and VS 244 can be operatively coupled to PFM 121 using a Fiber Channel connection or some other connection other than an Ethernet connection.

Additionally, VS 224, VS 244, and/or PFM 121 can provide substantially real-time or batch reports such as status, error, exception, and/or protocol information to control processor 122. For example, VS 224, VS 244, and/or PFM 121 can forward data packets that caused an error or exception at VS 224, VS 244, and/or PFM 121 to control processor 122. More specifically, for example, VS 224, VS 244, and/or PFM 121 can send reports including data packets with any of the following: a source identifier or destination identifier that cannot be resolved (e.g., an L2 or L3 (of the OSI model) address can not be located in a forwarding table), an error in a cyclic redundancy check ("CRC"), an expired time-to-live ("TTL") parameter, and/or other errors or exceptions. Additionally, VS 224, VS 244, and/or PFM 121 can send reports including or related to protocol information such as address resolution protocol ("ARP") packets, spanning tree protocol ("STP") packets, heartbeat or stay-alive packets, and/or other protocol packets. Furthermore, reports including utilization (e.g., a utilization value or percentage) and/or other statistics related to VS 224, VS 244, and/or PFM 121 can be sent from VS 224, VS 244, and/or PFM 121 to control processor 122.

In some embodiments, control processor 122 can alter a configuration (e.g., which network rules are implemented VS 224, VS 244, and/or PFM 121) in substantially real-time (e.g., in response to current network state and/or statistics). For example, control processor 122 can transfer (or move or migrate) network rules to or from VS 224, VS 244 and/or PFM 121 based on the utilization of any of VS 224, VS 244, and/or PFM 121. In other words, if server 122 has a relatively low utilization and PFM 121 has a relatively high utilization at some time, control processor 122 can configure VS 224 to implement some of the network rules (e.g., one or more network rules related to VM 225 and/or VM 226) previously implemented at PFM 121 and configure PFM 121 to not implement those network rules. When the utilization of PFM 121 decreases, control processor 122 can similarly transfer the network rules from VS 224 back to PFM 121.

Thus, in some embodiments, data packet processing and/or switching can be distributed within a network. Said differently, a control plane of an access switch (e.g., control and communications between a control processor, a packet forwarding module and one or more virtual packet forwarding modules) can be distributed within a network. With reference to FIG. 4, data packet processing and/or switching can be distributed by control processor 122 to PFM 121, VS 224, and VS 244. In other words, control processor 122 can configure VS 224 and VS 244 as packet forwarding modules. Said differently, VS 224 and VS 244 can function as virtual packet forwarding modules within a data plane (e.g., transmitting and receiving data packets to and from network devices including virtual network devices) and a distributed control place (e.g., transmitting and receiving control instructions, reports, and status and other control information).

Figure 5:
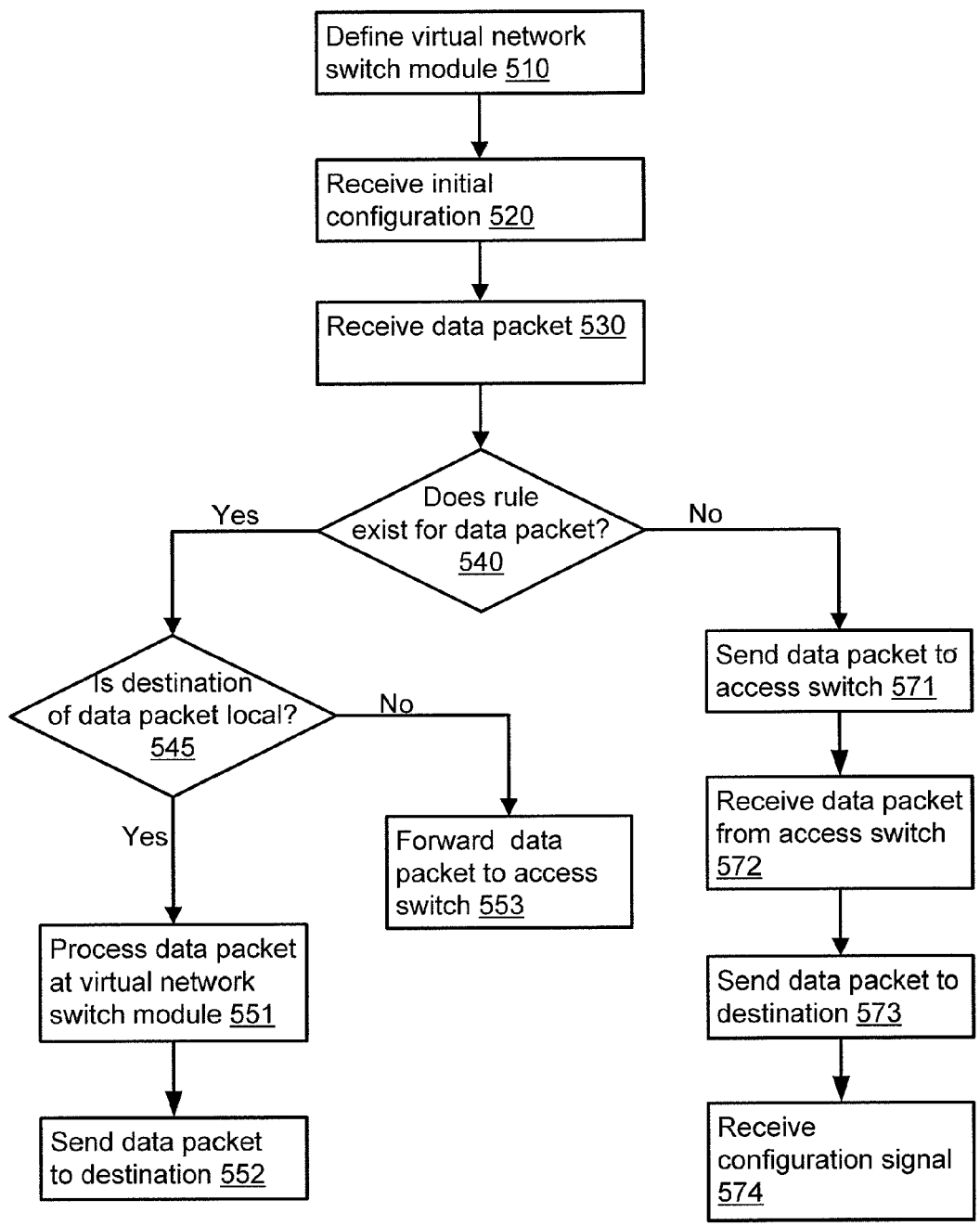
FIG. 5 is a flow chart of a method of switching a data packet at a virtual network switch module, according to an embodiment.

FIG. 5 is a flow chart of a method of switching a data packet at a virtual network switch module, according to an embodiment. Process 500 can be implemented, for example, as a software module (e.g., source code, object code, one or more scripts, or instructions) stored at a memory and operable to be executed and/or interpreted or compiled at a processor operatively coupled to the memory at a computing device. For example, processor-executable instructions stored at a memory of a computing device can be executed at a processor at the computing device to cause the processor to execute the steps of process 500. In some embodiments, process 500 can be implemented as one or more hardware modules such as, for example, an ASIC, an FPGA, a processor, or other hardware module at a computing device. In some embodiments, process 500 can be implemented as a combination of one or more hardware modules and software modules at a computing device such as a server or element (e.g., component, module, system, subsystem, or assembly) of a switch fabric.

A virtual network switch module at, for example, a server is defined, at 510, and is initially configured, at 520. A virtual network switch module can be defined at a server by instantiating and/or initialize software modules, application programs, data structures, hardware devices, ingress ports or queues, egress ports or queues, and/or other mechanisms based on the configuration file. A control processor at an access switch can configure the virtual network switch module based on a network rules described in a configuration file. In some embodiments, the configuration file can be a configuration file associated with a packet forwarding device such as, for example, an access switch of a switch fabric. In some embodiments, the configuration file can be referred to as an access switch configuration file.

A data packet is then received at a server, at 530. For example, a data packet sent from one virtual network device hosted at a server to another virtual network device hosted at that server can be received at a virtual network switch module hosted at that server. If one or more rules, filters, ACLs, mirroring capabilities, intrusion detection mechanisms, counters, flow tables, and/or other features or mechanisms at the virtual network switch module are satisfied or apply to the data packet, at 540, a destination of the data packet is determined, at 545.

If the data packet has a destination that is local to a virtual network switch module, the data packet can be processed at the virtual network switch module, at 551. In other words, if the destination of the data packet is at the server hosting the virtual network switch module (e.g., the destination is a virtual network device (or virtual machine) hosted at the server), the virtual network switch module can process the data packet, at 551, and forward the data packet to the destination, at 552.

If the data packet has a destination that is not local to a virtual network switch module, the data packet can be forwarded to an access switch, at 553, and processed at the access switch. Said differently, if the destination of the data packet is at a server other than the server hosting the virtual network switch module (e.g., the destination is a virtual network device (or virtual machine) hosted at another server), the virtual network switch module can forward the data packet to an access switch and the access switch can process and forward the data packet to the destination.

Returning to step 540, if no rules, filters, ACLs, mirroring capabilities, intrusion detection mechanisms, counters, flow tables, and other features or mechanisms exists for the packet at, for example, a server or virtual network switch module implementing process 500, the data packet can be sent to another device for processing (e.g., at an access switch), at 571. As discussed above, in some embodiments, as illustrated in FIG. 5, the destination of the data packet is operatively coupled to the virtual network switch module implementing or executing process 500 and the data packet is sent to the virtual network switch module from the access switch and received at the virtual network switch module, at 572, after the data packet is processed at the other device (e.g., an access switch). After the data packet has been received (e.g., at a virtual network switch module), the data packet can be sent or forwarded to a destination such as a virtual network device operatively coupled to the virtual network switch module, at 573.

In addition to forwarding the data packet to the virtual network switch module, the access switch can configure a network rule at the virtual network switch module. The virtual network switch module implementing process 500 can receive a configuration signal, at 574, from the access switch. In other words, the access switch can configure the virtual network switch module implementing process 500 to implement a network rule or process data packets based on the network rule. The network rule can be related to the data packet, and can be used by the virtual network switch module to process other data packets similar to the data packet after the virtual network switch module is configured to implement the network rule. For example, the configuration signal from the access switch can update a rule table (e.g., a routing table or a switching table) at the virtual network switch module. Thus, an access switch can reactively provide network rules to a virtual network switch module in response to data packets forwarded to the access switch by the virtual network switch module for processing.

In some embodiments, process 500 can include more or fewer steps than illustrated in FIG. 5. In some embodiments, some steps may occur in a different order, for example, to account for added steps, pre- or post-processing, etc. For example, in some embodiments a data packet for which a virtual network switch module does not include a network rule has a destination at a server other than the server at which the virtual network switch module is hosted, and steps 572, 573 and 574 are not performed.

Figure 6:
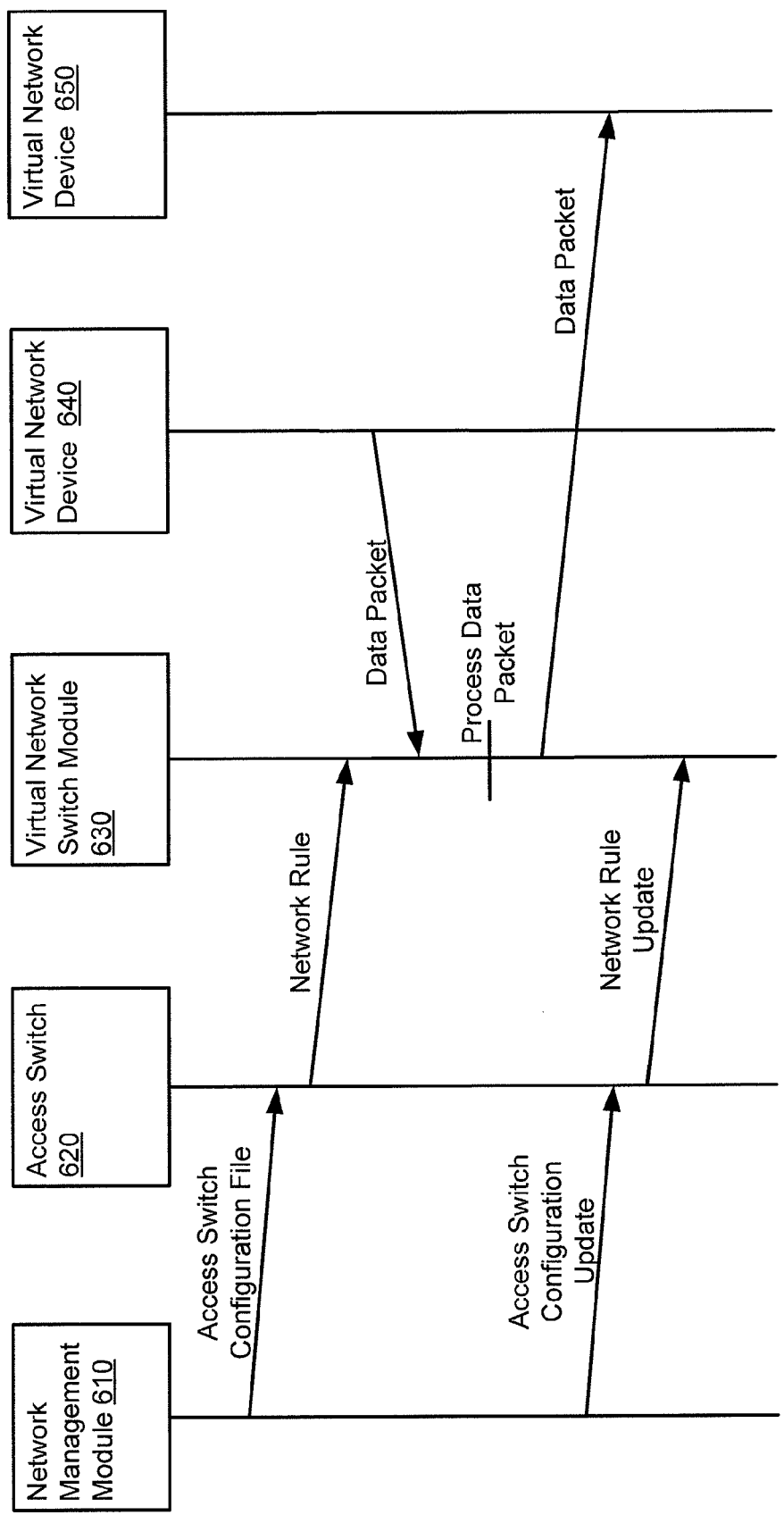
FIG. 6 is a communication flow diagram of configuration and switching at a virtual network switch module, according to an embodiment.

FIG. 6 is a communication flow diagram of configuration and switching at a virtual network switch module, according to an embodiment. The communication flow illustrated in FIG. 6 can be referred to as proactive provisioning or configuration of a virtual network switch module. Network management module 610 can send an access switch configuration file including rules, filters, and/or other configuration information (e.g., ACLs, mirroring capabilities, intrusion detection mechanisms, counters, flow tables, and/or other features or mechanisms) to access switch 620. Access switch 620 receives the access switch configuration file and configures (or provisions) itself based on the access switch configuration file. For example, access switch 620 can instantiate and/or initialize data structures, hardware devices, ingress ports or queues, egress ports or queues, and/or other mechanisms in response to receiving the access switch configuration file.

Additionally, access switch 620 can configure (or provision) any servers hosting or configured to host virtual network switch modules with network rules from the configuration file. In some embodiments, access switch 620 configures such servers that are operatively coupled to access switch 620 with network rules at the time access switch 620 receives the access switch configuration file. In some embodiments, access switch 620 configures such servers with network rules each time such a server becomes operatively coupled to access switch 620 or when access switch 620 determines that such a server is operatively coupled to access switch 620. Said differently, access switch 620 can store the access switch configuration file and configure the servers hosting or configured to host virtual network switch modules with network rules when access switch 620 detects such a server. In other words, access switch 620 can push the network rules to virtual network switch module 630 or a server hosting or configured to host virtual network switch module. In some embodiments, a virtual network switch module (or a server hosting or configured to host a virtual network switch module) can request network rules from an access switch at periodic intervals or based on some condition such as a change in the configuration of the server hosting the virtual network switch module.

In some embodiments, the configuration file received at access switch 620 can include multiple classes or types of rules, filters, and/or other configuration information (e.g., ACLs, mirroring capabilities, intrusion detection mechanisms, counters, flow tables, and/or other features or mechanisms). For example, an access switch can be operatively coupled to a server and a switch fabric. The access switch can communicate with the server using data packets and with the switch fabric using data cells. One type of rules, filters, and/or other configuration information (e.g., ACLs, mirroring capabilities, intrusion detection mechanisms, counters, flow tables, and/or other features or mechanisms) can relate to data packets and another type of rules, filters, and/or other configuration information (e.g., ACLs, mirroring capabilities, intrusion detection mechanisms, counters, flow tables, and/or other features or mechanisms) can related to data cells. In some embodiments, one class of rules, filters, and/or other configuration information (e.g., ACLs, mirroring capabilities, intrusion detection mechanisms, counters, flow tables, and/or other features or mechanisms) can be used to configure virtual network switch module 630 and another class of rules, filters, and/or other configuration information (e.g., ACLs, mirroring capabilities, intrusion detection mechanisms, counters, flow tables, and/or other features or mechanisms) is not used to configure virtual network switch module 630. For example, the class of rules, filters, and/or other configuration information (e.g., ACLs, mirroring capabilities, intrusion detection mechanisms, counters, flow tables, and/or other features or mechanisms) related to data packets can be used to configure virtual network switch module 630, and the class of rules, filters, and/or other configuration information (e.g., ACLs, mirroring capabilities, intrusion detection mechanisms, counters, flow tables, and/or other features or mechanisms) are not be used to configure virtual network switch module 630.

In some embodiments, virtual network switch module 630 can provide access switch 620 with information related to virtual network devices operatively coupled to virtual network switch module 630. For example, virtual network switch module 630 can provide identifiers such as, for example, Internet Protocol ("IP") addresses and/or Medium Access Control ("MAC") addresses related to virtual network devices 640 and 650 to access switch 620. In some embodiments, rules, filters, and/or other configuration information (e.g., ACLs, mirroring capabilities, intrusion detection mechanisms, counters, flow tables, and/or other features or mechanisms) can relate to one or more virtual network devices, and access switch 620 can determine which of the rules, filters, and/or other configuration information (e.g., ACLs, mirroring capabilities, intrusion detection mechanisms, counters, flow tables, and/or other features or mechanisms) in the configuration files are related to virtual network devices 640 and/or 650 based on, for example, the identifiers of virtual network devices 640 and/or 650. Access switch 620 can then send the rules, filters, and/or other configuration information (e.g., ACLs, mirroring capabilities, intrusion detection mechanisms, counters, flow tables, and/or other features or mechanisms) that relate to virtual network devices 640 and/or 650 to virtual network switch module 630. In other words, access switch 620 can configure virtual network switch module 630 to implement a subset of the network rules described in the configuration file that relates to or is associated with particular virtual network devices to virtual network switch module 630.

In some embodiments, a control processor at access switch 620 can request that a server hosting or configured to host virtual network switch modules instantiate or initialize virtual network switch module 630. In other words, access switch 620 can instantiate virtual network switch module 630 (or request instantiation of virtual network switch module 630) and subsequently configure virtual network switch module 630 based on network rules in the configuration file.

Configuration at virtual network switch module 630 based on network rules such as filters, and/or other configuration information (e.g., ACLs, mirroring capabilities, intrusion detection mechanisms, counters, flow tables, and/or other features or mechanisms) included in the access switch configuration file can include register and/or memory writes and/or reads by a control processor at access switch 620. For example, access switch 620 can instantiate and/or initialize data structures, hardware devices, ingress ports or queues, egress ports or queues, and/or other mechanisms at virtual network switch module 630. In some embodiments, one or more software modules such as application programs hosted or executing at the server hosting virtual network switch module 630 can provision virtual network switch module 630 based on configuration instructions sent to that server from access switch 620.

After virtual network switch module 630 has been provisioned, virtual network device 640 can send a data packet to virtual network device 650, each hosted at the server hosting virtual network switch module 630. As illustrated in FIG. 6, virtual network device 640 sends the data packet to virtual network switch module 630. Virtual network switch module 630 receives the data packet and processes (e.g., applies rules, filters, ACLs, security mechanisms, counters, and/or flow tables to) the data packet. The processing at virtual network switch module 630 includes determining a destination for the data packet. For example, virtual network switch module 630 can determine based on a destination address field of the data packet that virtual network device 650 is the destination of the data packet. Virtual network switch module 630 can then forward the data packet to virtual network device 650.

Network management module 610 can define, for example, in response to a detected change in a network topology including addition, removal, and/or change in an operational status of one or more network devices or portions of a switch fabric and can provide an access switch configuration file update to access switch 620. An access switch configuration file update can be a new configuration file including additional and/or different (e.g., changed parameter values) rules, filters, ACLs, mirroring capabilities, intrusion detection mechanisms, counters, flow tables, and/or other features or mechanisms. In some embodiments, an access switch configuration file update can represent a delta or change from a previous or initial access switch configuration file, and can include only those rules, filters, ACLs, mirroring capabilities, intrusion detection mechanisms, counters, flow tables, and/or other features or mechanisms (and/or related parameters) that have changed or been updated, for example, by network management module 610 since the initial (or most recent) access switch configuration file was defined.

In some embodiments, the access switch configuration file update can be defined or generated in response to a change in a network policy including rules and/or filters. The access switch configuration file update can be received at access switch 620 and access switch 620 can update its configuration or provisioning based on the access switch configuration file update. Additionally, access switch 620 can configure virtual network switch modules hosted at servers operatively coupled to access switch 620 with a network rule update. For example, access switch 620 can change register values set during a previous configuration at virtual network switch module 630. In some embodiments, access switch 620 can selectively configure virtual network switch module 630 based exclusively on the portions of the access switch configuration file update that are related to virtual network devices 640 and/or 650 or to virtual network switch module 630. As discussed above, in some embodiments a virtual network switch module (or a server hosting or configured to host a virtual network switch module) can request a network rule update from an access switch at periodic intervals or based on some condition such as a change in the configuration of the server hosting the virtual network switch module. After the configuration of virtual network switch module 630 has been updated, virtual network switch module 630 can subsequently process data packets based on the access switch configuration file update.

In some embodiments, access switch 620 can update a network rule, add a network rule, and/or remove a network rule from the configuration of virtual network switch module 630 without receiving an access switch configuration update from network management module 610. For example, a control processor at access switch 620 can receive status reports from a packet forwarding module at access switch 620 (or at another device operatively coupled to a communications network) and from virtual network switch module 630 (i.e., from a virtual packet forwarding module). The control processor can transfer network rules to and from the packet forwarding module and virtual network switch module 630 based on current, past, or expected utilization of the packet forwarding module and/or virtual network switch module 630. Said differently, a control processor at access switch 620 can disable network rules at the packet forwarding module and enable those network rules at virtual network switch module 630. Additionally, a control processor at access switch 620 can disable network rules at virtual network switch module 630 and enable those network rules at the packet forwarding module.

Figure 7:
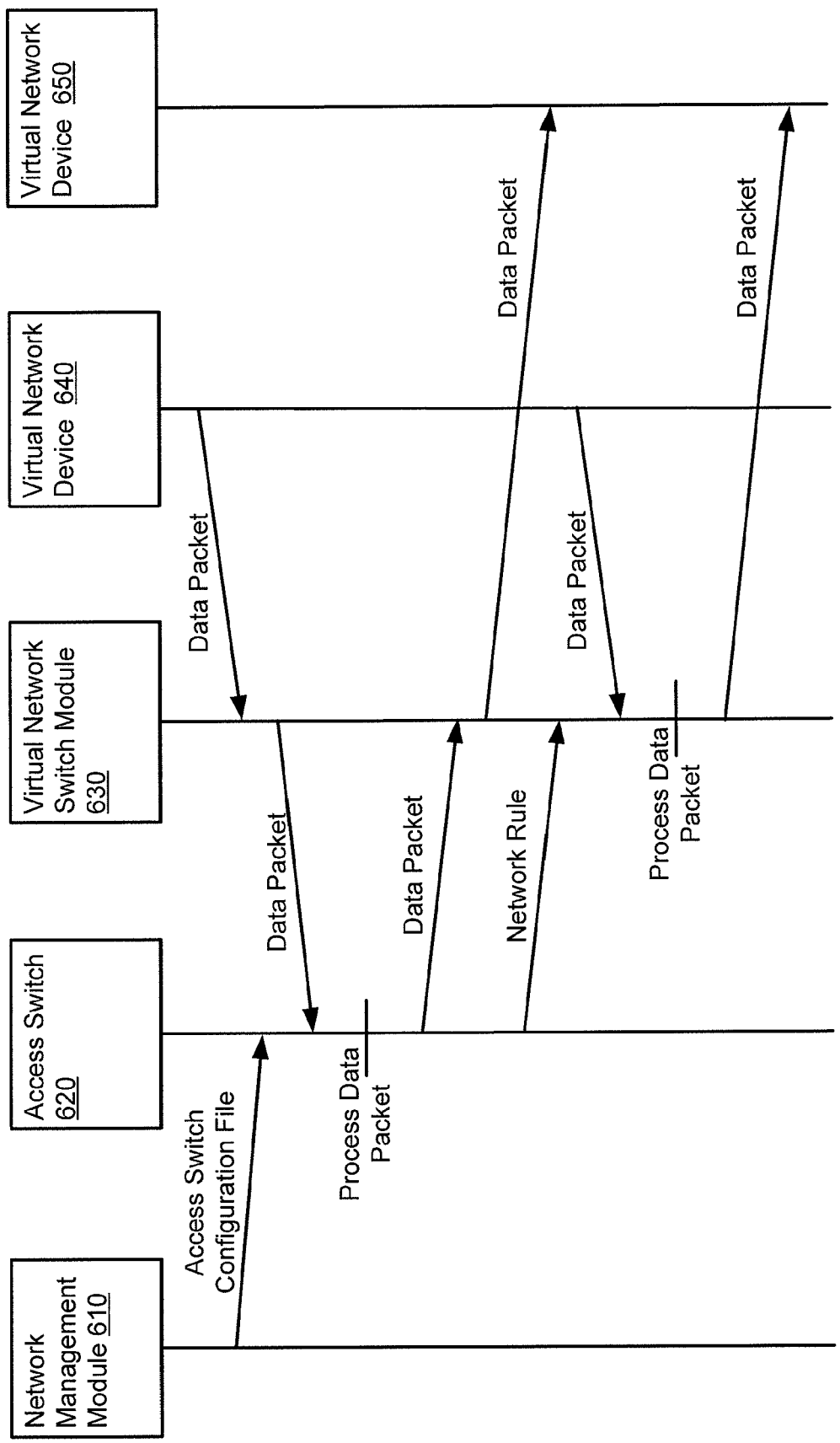
FIG. 7 is another communication flow diagram of configuration and switching at a virtual network switch module, according to an embodiment.

FIG. 7 is another communication flow diagram of configuration and switching at a virtual network switch module, according to an embodiment. The communication flow illustrated in FIG. 7 can be referred to as reactive provisioning or configuration of a virtual network switch module. Network management module 610 can send an access switch configuration file including rules, filters, and/or other configuration information (e.g., rules, filters, ACLs, mirroring capabilities, intrusion detection mechanisms, counters, flow tables, and/or other features or mechanisms) to access switch 620. Access switch 620 receives the access switch configuration file and configures (or provisions) itself based on the access switch configuration file. For example, access switch 620 can instantiate and/or initialize data structures, hardware devices, ingress ports or queues, egress ports or queues, and/or other mechanisms in response to receiving the access switch configuration file.

Virtual network device 640 can send a data packet to virtual network device 650, each hosted at the server hosting virtual network switch module 630, for example as illustrated in the following flows. Virtual network device 640 sends the data packet to virtual network switch module 630. Virtual network switch module 630 receives the data packet and attempts to processes (e.g., applies any applicable rules, filters, ACLs, counters, security mechanisms, and/or flow tables stored at virtual network switch module 630 to) the data packet. As illustrated in FIG. 7, virtual network switch module 630 does not include a rule, filter, or other information for processing the data packet, and forwards the data packet to access switch 620 for processing. Access switch 620 includes processing information (e.g., rules, filters, ACLs, mirroring capabilities, intrusion detection mechanisms, counters, flow tables, and other features or mechanisms) related to processing the data packet, and access switch 620 processes the data packet. The processing at access switch 620 includes determining a destination for the data packet. For example, access switch 620 can determine based on a destination address field of the data packet that virtual network device 650 is the destination of the data packet. Access switch 620 can then alter or define a destination data field of the data packet and forward the data packet to virtual network switch module 630. Virtual network switch module 630 then forwards the data packet to virtual network device 650 based on, for example, the destination data field of the data packet.

After access switch 620 forwards the data packet to virtual network switch module 630, access switch 620 configures virtual network switch module 630 with a network rule related to the data packet. In some embodiments, the network rule can be a rule related to an identifier of a virtual network device included in the data packet as, for example, a source parameter or destination parameter. In some embodiments, access switch 620 can send a group of rules, filters, and/or other configuration information (e.g., ACLs, mirroring capabilities, intrusion detection mechanisms, counters, flow tables, and/or other features or mechanisms) that are related to one or more virtual network devices operatively coupled to virtual network switch module 630 based on, for example, an identifier of the virtual network devices to virtual network switch module 630.

Thus, access switch 620 (or a control processor at access switch 620) can update the configuration or provisioning of virtual network switch module 630 based on the network rule (or the group of rules, filters, and/or other configuration information such as ACLs, mirroring capabilities, intrusion detection mechanisms, counters, flow tables, and/or other features or mechanisms). For example, access switch 620 can update a routing table, a switch table, a forwarding table, and/or a flow table, or cause virtual network switch module 630 to drop a packet, mirror a packet to another destination, and/or apply some other rules, filters, ACLs, mirroring capabilities, intrusion detection mechanisms, and/or counters based on the network rule. In other words, the network rule can be applied to virtual network switch module 630.

As illustrated in FIG. 7, after the network rule is applied to virtual network switch module 630, virtual network switch module 630 can route or forward data packets based on the network rule. In other words, virtual network switch module 630 can handle data packets to which the network rule relates. For example, virtual network device 640 can send a data packet to virtual network device 650 via virtual network switch module 630, as illustrated in FIG. 7. Virtual network switch module 630 can process the data packet based on the network rule, and forward the data packet to virtual network device 650.

In some embodiments, virtual network devices can migrate from one server operatively coupled to a communication network to another server operatively coupled to that communications network. In some embodiments, a virtual network switch module and/or a hypervisor can forward rules, filters, and/or other configuration information (e.g., ACLs, mirroring capabilities, intrusion detection mechanisms, counters, flow tables, and/or other features or mechanisms) related to a virtual network device to a server to which the virtual network device is to be migrated. In other words, the rules, filters, and/or other configuration information (e.g., ACLs, mirroring capabilities, intrusion detection mechanisms, counters, flow tables, and/or other features or mechanisms) related to a virtual network device can be sent with other parameters (e.g., operating state) of that virtual network device to a server at which the virtual network device will be instantiated after migration of that virtual network device. In some embodiments, the virtual network switch module can discard or delete the rules, filters, and/or other configuration information (e.g., ACLs, mirroring capabilities, intrusion detection mechanisms, counters, flow tables, and/or other features or mechanisms) related to that virtual network device after that virtual network device has been migrated (or transferred) from the server hosting the virtual network switch module and the virtual network device before the migration. In some embodiments, an access switch or a control processor at an access switch can configure (or update a configuration of) one or more virtual network switch modules after a virtual network device has migrated from one server in a network to another server in the network.

Figure 8:
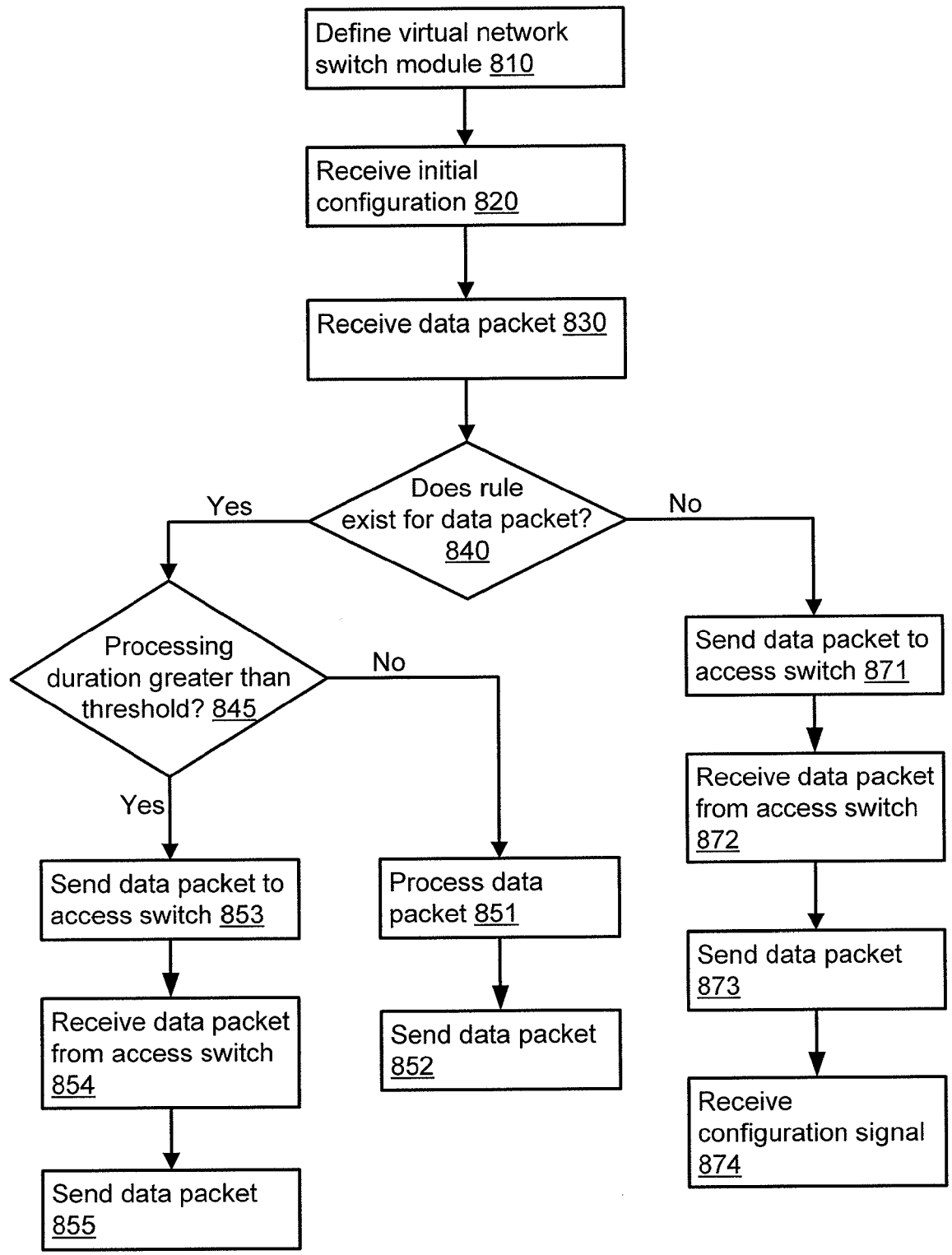
FIG. 8 is a flow chart of a method of provisioning and switching at a virtual network switch module, according to an embodiment.

FIG. 8 is a flow chart of a method of provisioning and switching at a virtual network switch module, according to an embodiment. Process 800 can be implemented, for example, as a software module (e.g., source code, object code, one or more scripts, or instructions) stored at a memory and operable to be executed and/or interpreted or compiled at a processor operatively coupled to the memory at a computing device. For example, processor-executable instructions stored at a memory of a computing device can be executed at a processor at the computing device to cause the processor to execute the steps of process 800. In some embodiments, process 800 can be implemented as one or more hardware modules such as, for example, an ASIC, an FPGA, a processor, or other hardware module at a computing device. In some embodiments, process 800 can be implemented as a combination of one or more hardware modules and software modules at a computing device such as a server or element (e.g., component, module, system, subsystem, or assembly) of a switch fabric.

A virtual network switch module at, for example, a server is defined, at 810, and is initially configured, at 820. A virtual network switch module can be defined at a server by instantiating and/or initialize software modules, application programs, data structures, hardware devices, ingress ports or queues, egress ports or queues, and/or other mechanisms based on the configuration file. A control processor at an access switch can configure the virtual network switch module based on a network rules described in a configuration file. In some embodiments, the configuration file can be a configuration file associated with a packet forwarding device such as, for example, an access switch of a switch fabric. In some embodiments, the configuration file can be referred to as an access switch configuration file.

A data packet is then received at a server, at 830. For example, a data packet sent from one virtual network device hosted at a server to another virtual network device hosted at that server can be received at a virtual network switch module hosted at that server. If one or more rules, filters, ACLs, mirroring capabilities, intrusion detection mechanisms, counters, flow tables, and/or other features or mechanisms at the virtual network switch module are satisfied or apply to the data packet, at 840, a processing duration is determined, at 845. In other words, if a network rule exists for the data packet, a server (or a virtual network switch module hosted at a server) can determine an amount of time required (or estimated or calculated) to process the data packet (e.g., apply the rule to the data packet) at that server. If the processing duration is less than a threshold, the data packet can be processed at that server, at 851. Said differently, if the amount of time require to process the data packet at that server is less than a threshold, the data packet can be processed at that server. After the data packet is processed, at 851, the data packet can be sent or forwarded to, for example, a destination of the data packet, at 852.

If the processing duration is greater than the threshold, at 845, the data packet can be sent to a forwarding device such as, for example, an access switch operatively coupled to a switch fabric, at 853. Said differently, if the amount of time required (or estimated or calculated) to process the data packet at the server is greater than the threshold, the data packet can be off-loaded or sent to another device (e.g., an access switch) for processing. For example, the data packet can be sent to an access switch having specialized hardware and/or software configured to provide high-speed processing of that data packet. As an example, an access switch can include purpose-built hardware (e.g., an ASIC) to provide high-speed classification of data packets. Additionally, some rules, filters, and/or other configuration information (e.g., ACLs, mirroring capabilities, intrusion detection mechanisms, counters, flow tables, and/or other features or mechanisms) can be applied to data packet exclusively at an access switch, and a virtual network switch module can forward a data packet to an access switch to be processed based on those rules, filters, and/or other configuration information (e.g., ACLs, mirroring capabilities, intrusion detection mechanisms, counters, flow tables, and/or other features or mechanisms). In other words, a data packet can be forwarded to an access switch for additional processing.

In some embodiments, the threshold can be determined or assigned before the data packet is received. For example, the threshold can be determined or assigned during initialization or configuration of a virtual network switch module. The threshold can be determined based on, for example, computational capabilities (e.g., processor speed, number of processors, available memory, and memory speed) of a server hosting the virtual network switch module, computational complexity of rules, filters, and/or other configuration information (e.g., ACLs, mirroring capabilities, intrusion detection mechanisms, counters, flow tables, and/or other features or mechanisms) to be applied to data packets, and/or time constraints and/or bandwidth limitations within a communications network.

In some embodiments, the thresholds can be determined or assigned dynamically (e.g., during operation of the virtual network switch module) or in real-time (e.g., determined after a data packet is received) based on present utilization of a communications network or server hosting the virtual network switch module. For example, if the server is operating at a relatively low utilization, a data packet can be processed because the server can allocate sufficient resources (e.g., processor time or memory) to the rules, filters, and/or other configuration information (e.g., ACLs, mirroring capabilities, intrusion detection mechanisms, counters, flow tables, and/or other features or mechanisms). If the server is operating at a relatively high utilization, a data packet can be off-loaded to an access switch for processing because the server can not allocate sufficient resources (e.g., processor time or memory) to the rules, filters, and/or other configuration information (e.g., ACLs, mirroring capabilities, intrusion detection mechanisms, counters, flow tables, and/or other features or mechanisms). Similarly, in some embodiments, a threshold that is assigned before a data packet is received can be updated or changed as communications network and/or server utilizations changes over time such that the value of the threshold at the point in time when a packet is received at a virtual network switch module is used. In other words, a threshold can be determined statically and modified dynamically.

In some embodiments, transfer of a data packet to an access switch for processing can be transparent to a recipient (e.g., a destination virtual network switch module) of the data packet. For example, the data packet can be forwarded to the access switch, processed, and forwarded back to the virtual network switch module and a TTL parameter of the data packet can be unchanged. In other words, the data packet can be processed at the access switch and/or virtual network switch module such that the recipient of the data packet cannot distinguish the data packet from another data packet that was not forwarded for processing to the access switch.

In some embodiments, as illustrated in FIG. 8, the destination of the data packet is operatively coupled to the virtual network switch module implementing or executing process 800 and the data packet is sent to the virtual network switch module from the access switch and received at the virtual network switch module at 854, after the data packet is processed at the other device. After the data packet has been received (e.g., at a virtual network switch module), the data packet can be sent or forwarded to a destination such as a virtual network device operatively coupled to the virtual network switch module, at 855.

Returning to step 840, if no rules, filters, ACLs, mirroring capabilities, intrusion detection mechanisms, counters, flow tables, and other features or mechanisms exists for the packet at, for example, a server or virtual network switch module implementing process 800, the data packet can be sent to another device for processing, at 871. As discussed above, in some embodiments, as illustrated in FIG. 8, the destination of the data packet is operatively coupled to the virtual network switch module implementing or executing process 800 and the data packet is sent to the virtual network switch module from the access switch and received at the virtual network switch module, at 872, after the data packet is processed at the other device. After the data packet has been received (e.g., at a virtual network switch module), the data packet can be sent or forwarded to a destination such as a virtual network device operatively coupled to the virtual network switch module, at 873.

In addition to forwarding the data packet to the virtual network switch module, the access switch can configure a network rule at the virtual network switch module. The virtual network switch module implementing process 800 can receive a configuration signal, at 874, from the access switch. In other words, the access switch can configure the virtual network switch module implementing process 800 to implement a network rule or process data packets based on the network rule. The network rule can be related to the data packet, and can be used by the virtual network switch module to process other data packets similar to the data packet after the virtual network switch module is configured to implement the network rule. For example, the configuration signal from the access switch can update a rule table (e.g., a routing table or a switching table) at the virtual network switch module. Thus, an access switch can reactively provide network rules to a virtual network switch module in response to data packets forwarded to the access switch by the virtual network switch module for processing.

In some embodiments, process 800 can include more or fewer steps than illustrated in FIG. 8. In some embodiments, some steps may occur in a different order, for example, to account for added steps, pre- or post-processing, etc. For example, in some embodiments, a virtual network switch module is defined (e.g., instantiated or initialized) before a configuration file is received. In some embodiments, a request for a configuration file is sent before the configuration file is received. Additionally, in some embodiments, a configuration file is not received before the data packet is received. Furthermore, in some embodiments, an access switch can send a configuration file to a virtual network switch module at, for example, step 874 rather than a network rule. Said differently, an access switch can send an entire configuration file in response to a receiving a data packet from a virtual network switch module.

It is intended that the methods and services described herein can be performed by software, hardware, or a combination thereof. Hardware modules may include, for example, a general-purpose processor, an FPGA, and/or an ASIC. Software modules can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, and files containing higher-level instructions that are executed by a computer using an interpreter. Additional examples of computer code include, but are not limited to, control signals, encrypted code, and compressed code. Although a few embodiments have been shown and described, it will be appreciated that various changes and modifications might be made.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs ("CD"/"DVDs"), Compact Disc-Read Only Memories ("CD-ROMs"), and holographic devices; magneto-optical storage media such as optical disks; carrier wave signal processing modules; and hardware devices that are specially configured to store and execute program code, such as application-specific integrated circuits ("ASICs"), Programmable Logic Devices ("PLDs"), and Read-Only Memory ("ROM") and Random-Access Memory ("RAM") devices.

While various embodiments have been described above, it should be understood that they have been presented by way of example only, not limitation, and various changes in form and details may be made. For example, although described in relation to a switch fabric, embodiments disclosed herein are applicable to other communications networks, and embodiments disclosed herein in relation to one network rule can be applicable to other network rules. Additionally, embodiments described in relation to software modules are generally applicable to hardware modules; and embodiments described in relation to hardware modules are generally applicable to software modules. Any portion of the apparatus and/or methods described herein may be combined in any combination, except mutually exclusive combinations. The embodiments described herein can include various combinations and/or sub-combinations of the functions, components and/or features of the different embodiments described. For example, methods and apparatus discussed in relation to proactive or reactive configuration can be applicable to the other. Furthermore, each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method, comprising:
   sending a configuration signal to a virtual network switch module within a control plane of a communications network, the configuration signal configured to define a first network rule at the virtual network switch module;
   configuring a packet forwarding module such that the packet forwarding module implements a second network rule;
   receiving, via the control plane, status information from the virtual network switch module and status information from the packet forwarding module;
   receiving a data packet from the virtual network switch, when a processing duration for the data packet determined by the virtual network switch exceeds a threshold, the first network rule being applied to the data packet by the virtual network switch when the determined processing duration does not exceed the threshold, the determined processing duration being associated with the first network rule.

2. The method of claim 1, wherein the receiving the status information from the virtual network switch module and the status information from the packet forwarding module is at a first time and the configuration signal is a first configuration signal, the method further comprising:
   receiving, at a second time after the first time, a third network rule; and sending, at a third time after the second time, a second configuration signal to the virtual network switch module, the second configuration signal configured to define the third network rule at the virtual network switch module.

3. The method of claim 1, wherein the receiving the status information from the virtual network switch module and the status information from the packet forwarding module is at a first time and the configuration signal is a first configuration signal, the method further comprising:
sending, at a second time after the first time, a second configuration signal to the virtual network switch module in response to at least one of the status information from the virtual network switch module or the status information from the packet forwarding module, the second configuration signal configured to define a third network rule at the virtual network switch module.

4. The method of claim 1, wherein the configuration signal includes an instruction to change a data value stored at a memory associated with the virtual network switch module.

5. The method of claim 1, further comprising:
receiving, before the sending, a configuration file including a description of the first network rule and a description of the second network rule.

6. The method of claim 1, wherein the data packet is a first data packet, the method further comprising:
receiving a second data packet from the virtual network switch module within a data plane of the communications network; and
sending a second configuration signal to the virtual network switch module within the control plane of the communications network in response to the receiving the second data packet from the virtual network switch module, the second configuration signal configured to define a third network rule at the virtual network switch module.

7. The method of claim 1, wherein:
the virtual network switch module is a first virtual network switch module hosted at a first computing device; and
the packet forwarding module is a second virtual network switch module hosted at a second computing device.

8. The method of claim 1, wherein the communications network is a multi-stage switch fabric.

9. An apparatus, comprising:
a packet forwarding module configured to forward data packets based on a plurality of network rules defined at the packet forwarding module; and
a processor operatively coupled to the packet forwarding module, the processor in communication via the packet forwarding module with a first virtual network switch module hosted at a first computing device and a second virtual network switch module hosted at a second computing device, the processor configured to configure the first virtual network switch module to apply a first network rule to data packets received at the first virtual network switch module, the processor configured to configure the second virtual network switch module to apply a second network rule to data packets received at the second virtual network switch module,
the processor also configured to receive a data packet from the first virtual network switch module, when a processing duration for the data packet determined by the first virtual network switch module exceeds a threshold, the determined processing duration being associated with the first network rule, the first network rule being applied to the data packet by the first virtual network switch module when the determined processing duration does not exceed the threshold.

10. The apparatus of claim 9, wherein the packet forwarding module includes an application specific integrated circuit configured to perform data packet classification.

11. The apparatus of claim 9, wherein the processor is configured to receive status information from the first virtual network switch module and status information from the second virtual network switch module.

12. The apparatus of claim 9, wherein the processor is configured to receive protocol packets from the first virtual network switch module and protocol packets from the second virtual network switch module.

13. The apparatus of claim 9, wherein the processor is configured to receive exception packets from the first virtual network switch module and exception packets from the second virtual network switch module.

14. The apparatus of claim 9, wherein:
the processor is configured to determine a utilization value associated with the packet forwarding module; and
the processor is configured to remove a third network rule from the plurality of network rules defined at the packet forwarding module and configure the first virtual network switch module to apply the third network rule to data packets received at the first virtual network switch module.

15. The apparatus of claim 9, wherein the first network rule and the second network rule are the same network rule.

16. The apparatus of claim 9, wherein the processor is configured to define the plurality of network rules at the packet forwarding module.

17. A method, comprising:
receiving, from an access switch within a control plane of a communications network, a configuration signal configured to define a network rule at a virtual network switch module;
processing a first data packet at the virtual network switch module based on the network rule; and
sending status information associated with the virtual network switch module to the access switch within the control plane;
receiving a second data packet at the virtual network switch module;
determining a processing duration for the second data packet, the determined processing duration being associated with the network rule;
applying, when the determined processing duration is less than a threshold, the network rule to the second data packet; and
sending, when the determined processing duration is greater than the threshold, the second data packet to the access switch, within a data plane of the communications network.

18. The method of claim 17, wherein the configuration signal is a first configuration signal, and the network rule is a first network rule, the method further comprising:
receiving a third data packet at the virtual network switch module;
determining that the first network rule is not associated with the third data packet;
sending the third data packet to the access switch within the data plane of the communications network; and
receiving from the access switch a second configuration signal configured to define a second network rule at the virtual network switch module.

19. The method of claim 17, wherein the configuration signal includes an instruction to change a data value stored at a memory associated with the virtual network switch module.

* * * * *